United States Patent [19]

Kashiwamura et al.

[11] Patent Number: 6,132,108
[45] Date of Patent: Oct. 17, 2000

[54] DESIGN SUPPORT METHOD FOR A STRUCTURE AND THE LIKE

[75] Inventors: Takayoshi Kashiwamura; Masaki Shiratori; Qiang Yu, all of Yokohama, Japan

[73] Assignee: NHK Spring Co., Ltd., Yokohama, Japan

[21] Appl. No.: 08/999,070

[22] Filed: Dec. 29, 1997

[30] Foreign Application Priority Data

Jan. 23, 1997 [JP] Japan ................................ 9-010105

[51] Int. Cl.[7] .................................................. G06F 17/50
[52] U.S. Cl. .......................................... 395/500.23; 703/7
[58] Field of Search .................... 395/500.23, 500.28, 395/500.27

[56] References Cited

PUBLICATIONS

Hui, Blosiu and Wiberg, 'Taguchi method applied in optimization fo Shipley SJR 5740 positive resist deposition', Proceedings of SPIE vol. 3333, part 1–2, pp. 1304–1313 Feb. 1998 (abstract only).

Chou, 'Optimization of Jc of YBCO thin films prepared by photo–assisted MOCVD through statistical robust design', Journal Physica C, vol. 254, No. 1–2 pp. 93–112; Nov. 1995 (abstract only).

R. Unal, 'Space Transportation Vehicle Design Evaluation Using Saturated Designs', ASEE Faculty Fellowship program, NASA Study announcement GRAI9416, Dec. 1993.

Lan, '4–Level Orthogonal Array Dsgn as a Chemometric Approach to the Optimization of Polarographic Reaction Sys for Phosphorus', TALANTA Journal, vol. 41, N11 pp 1917–19, Nov. 1994 (Abs Only).

Muller, 'Variance Reduction by Simultaneous Multiexponential Analysis of Data Sets from Different Experiments', European Biophysics Journal vol. 19, N5, pp. 231–240, 1991 (Abstract Only).

*Primary Examiner*—Kevin J. Teska
*Assistant Examiner*—Lonnie A. Knox
*Attorney, Agent, or Firm*—Frishauf, Holtz, Goodman, Langer & Chick, P.C.

[57] ABSTRACT

A design support method includes an orthogonal array allocation step for arranging data regarding design variables and levels in columns and rows of an orthogonal array, a structural analysis step for carrying out structural analysis for data in each row of the orthogonal array, an analysis-of-variance step for carrying out an analysis of variance in accordance with the result of the structural analysis step, an estimation expression generation step for extracting those design variables and degree components which have high effectivity for characteristic values indicative of the properties of the object of analysis, in accordance with the analysis of variance, and generating estimation expressions based on orthogonal functions in accordance with the design variables and degree components, and an optimization process for making a target optimization calculation by using a mathematical optimization method. Reanalysis, evaluation of dispersion, and evaluation of reliability of structure, can be carried out by using the estimation expressions.

12 Claims, 9 Drawing Sheets

| COLUMN NO. / ROW NO. | 1 | 2 | 3 (σy) | 4 (H) | 5 (t) | 6 (A) | 7 (B) | 8 e | 9 e | 10 e |
|---|---|---|---|---|---|---|---|---|---|---|
| 1 | | | 294 | 490 | 1.4 | 50 | 50 | | | |
| 2 | | | 343 | 980 | 1.6 | 52.5 | 52.5 | | | |
| 3 | | | 392 | 1470 | 1.8 | 55 | 55 | | | |
| 4 | | | 441 | 1960 | 2.0 | 7.5 | 57.5 | | | |
| | | | | | | | | | | |
| 5 | | | 294 | 490 | 1.6 | 52.5 | 55 | | | |
| 6 | | | 343 | 980 | 1.4 | 50 | 57.5 | | | |
| 7 | | | 392 | 1470 | 2.0 | 57.5 | 50 | | | |
| 8 | | | 441 | 1960 | 1.8 | 55 | 52.5 | | | |
| | | | | | | | | | | |
| 9 | | | | | | | | | | |
FIG. 5
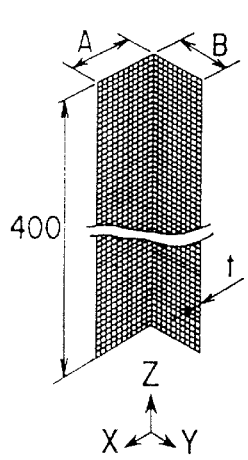
FIG. 6
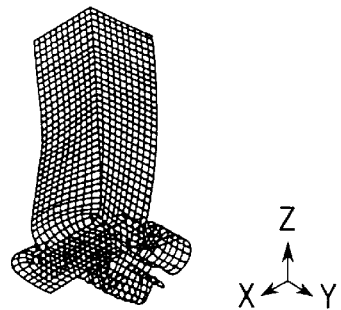
FIG. 7
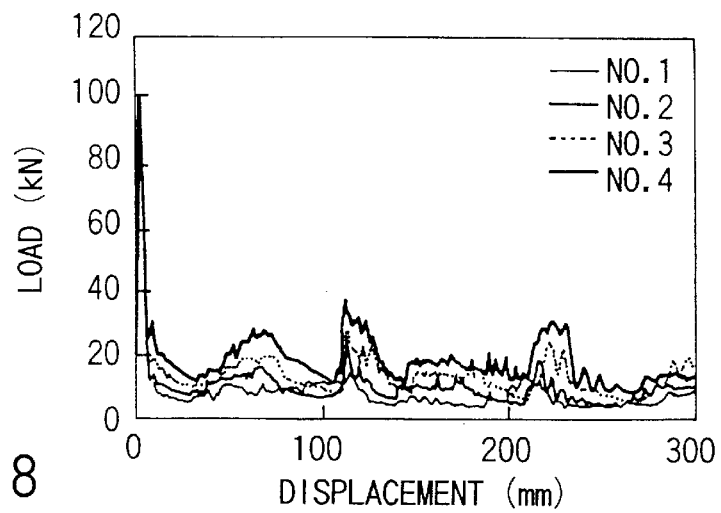
FIG. 8

DESIGN SUPPORT METHOD FOR A STRUCTURE AND THE LIKE

BACKGROUND OF THE INVENTION

The present invention relates to a design support method adapted to obtain effective information for supporting design of a structure, for example, or to analyze behavior of an object in the field of fluid mechanics, thermodynamics, or electromagnetics.

According to a finite element method (abbreviated as FEM) as an approach to structural analysis, behaviors of even those structures which display complicated shapes or phenomena can be easily simulated with use of computers and related technology (software) that have been developed so far. In general, structures are subject to tolerance or dispersion in dimensions, material properties, etc. In order to work out a high-accuracy practical design, therefore, each structure must be examined in consideration of dispersion. Known evaluation methods for dispersion or reliability of structure that are applicable to structural analysis include a stochastic finite element method based on the Monte Carlo analysis, method of perturbation, or sensitivity analysis.

According to the structural analysis described above, structures having given shapes can be simply analyzed in strength and rigidity. If the result of the analysis indicates that the design target is not attained, therefore, the structural analysis must be repeated by the method of trial and error. In the case where a plurality of design variables are used, moreover, combinations of all the variables are numerous, so that calculations for these combinations require much time and high costs. According to the aforesaid stochastic finite element method, moreover, nonlinear problems require a lot of calculations. For these reasons, the acquisition of final optimal design data entails a waste of time and additional costs, so that change of design and the like cannot be tackled with speed.

In recent years, mechanical parts are designed by employing a simulation technique that is based on structural analysis. In order to improve the efficiency and accuracy of a design operation, it is advisable to obtain quantitative effectivity for design variables and utilize it for the settlement of the construction and set values of each mechanical part. The mechanical parts often display complicated nonlinear behaviors during use. These nonlinear behaviors (phenomena) of the mechanical parts change with load and time. According to conventional methods of optimization and effectivity analysis, therefore, the effectivity analysis and optimization calculation for the design variables of the mechanical parts inevitably require a very sophisticated algorithm and bulky computation.

BRIEF SUMMARY OF THE INVENTION

Accordingly, an object of the present invention is to provide a design support method, capable of efficiently obtaining effective information in designing structures, for example, and of acquiring quantitative design data on even those structures that display complicated nonlinear behaviors.

In order to achieve the above object, the present invention comprises: an orthogonal array allocation step for arranging data on design variables and levels set according to an object of analysis in columns and rows of an orthogonal array selected in accordance with the design variables and levels; a structural analysis step for carrying out a structural analysis or experiment for data in each row of the orthogonal array; an analysis-of-variance step for carrying out an analysis of variance in accordance with the result of the structural analysis step; and an estimation expression generation step for extracting those design variables and degree components which have high effectivity for characteristic values indicative of the properties of the object of analysis, in accordance with the analysis of variance, and generating estimation expressions based on orthogonal functions in accordance with the extracted values.

Further, the invention may comprise an optimization process for making a target optimization calculation by using a mathematical optimization method after carrying out the estimation expression generation step. The mathematical optimization method stated herein may, for example, be the mathematical programming method or the so-called round robin computation method in which an optimal solution for the fulfillment of conditions is selected according to the result of calculation of all combinations of design variables and discrete values using objective functions and constraints functions generated on the basis of the estimation expressions.

Furthermore, the invention may comprise a reliability evaluation process for obtaining a numerical value indicative of evaluation of reliability by using a stochastic/statistical method after carrying out the optimization process. Moreover, the invention may comprise a sensitivity analysis step for carrying out a sensitivity analysis for effectivity by partially differentiating the estimation expressions with the design variables after carrying out the estimation expression generation step.

The invention may further comprise a second estimation expression generation step for generating an estimation expression of dispersion by using a stochastic/statistical method, such as the first-order second-moment (FOSM) method, in accordance with the result of the sensitivity analysis. Furthermore, the invention may comprise an optimization process for making a target optimization calculation by using a mathematical optimization method, such as the mathematical programming method, after carrying out the second estimation expression generation step.

A design support method according to the invention comprises an effectivity analysis process S1, as shown in FIG. 1. If necessary, this method comprises a reanalysis process S2, a dispersion evaluation process S3, an optimization process S4, a reliability evaluation process S5, etc. A design program, such as CAE (computer-aided engineering), can be used in the effectivity analysis process S1.

In the effectivity analysis process S1, an effectivity analysis that is applicable to even a nonlinear phenomenon is carried out by using effectivity analysis means that combines design of experiments and structural analysis or experiment. An explicit estimation expression of characteristic value is generated on the basis of this analysis. By partially differentiating this estimation expression with design variables, moreover, sensitivity for quantitatively evaluating the effectivity of the design variables is obtained.

In the reanalysis process S2, reanalysis is carried out by using the explicit estimation expression of characteristic value generated in the effectivity analysis process S1.

In the dispersion evaluation process S3, an estimation expression of dispersion of characteristic value is generated by applying the stochastic/statistical method, such as the first-order second-moment method, to the estimation expression of characteristic value. The dispersion is evaluated by a standard deviation, coefficient of variation, etc. that are obtained from the estimation expression of dispersion.

In the optimization process S4, optimization is carried out by the mathematical optimization method, such as the mathematical programming method, using the estimation expression of characteristic value and the estimation expression of dispersion as the objective functions or constraints functions for an optimization problem.

In the reliability evaluation process S5, information for the reliability of a structure is obtained by applying the stochastic/statistical method, e.g., the second-moment method, such as the method of first-order second-moment (FOSM) or advanced first-order second-moment (AFOSM), or a method for upper limit of probability of failure to an explicit performance function generated according to the aforesaid estimation expression of characteristic value.

According to the present invention, the following effects can be obtained.

(a) Applicability to Nonlinear Problem

All analysis results that can be obtained from the structural analysis, including representative values indicative of a phenomenon, can be used as characteristic values for the effectivity analysis. Accordingly, even a complicated nonlinear phenomenon can be analyzed with ease.

(b) Efficient Analysis with Low Structural Analysis Frequency

In the structural analysis according to the invention, calculation must only be made once for a specified combination of design variables. Unlike the conventional optimization method, therefore, the method of the invention requires no repeated or numerous calculations for the structural analysis.

(c) Utilization of Existing Structural Analysis and Optimization Programs

Since the steps for optimization calculation, structural analysis, etc. are independent of one another, the existing structural analysis programs and optimization programs can be utilized. Thus, a designer can take advantage of convenient up-to-date analytic faculties, and can enjoy use of a low-priced practical optimization system.

(d) Quantitative Access to Necessary Information for Design

The explicit estimation expression and sensitivity, useful information for design, can be easily obtained by the effectivity analysis. The estimation expression can be also used for a simple reanalysis method. Based on these data, moreover, evaluation of dispersion, evaluation of reliability of structure, or optimization calculation can be carried out efficiently.

(e) Integrated Design Support System Capable of Efficiently Carrying Out Consistent Effectivity Analysis, Evaluation of Dispersion, Optimization, Evaluation of Reliability of Structure, etc.

BRIEF DESCRIPTION OF THE SEVERAL VIEWS OF THE DRAWING

FIG. 5 is a diagram showing part of an orthogonal array to which data are allocated;

FIG. 6 is a diagram showing an example of element division in structural analysis of the side member;

FIG. 7 is a diagram showing the side member of FIG. 6 in a deformed state;

FIG. 8 is a diagram showing relations between displacement and load obtained by analysis;

DETAILED DESCRIPTION OF THE INVENTION

Figure 1:
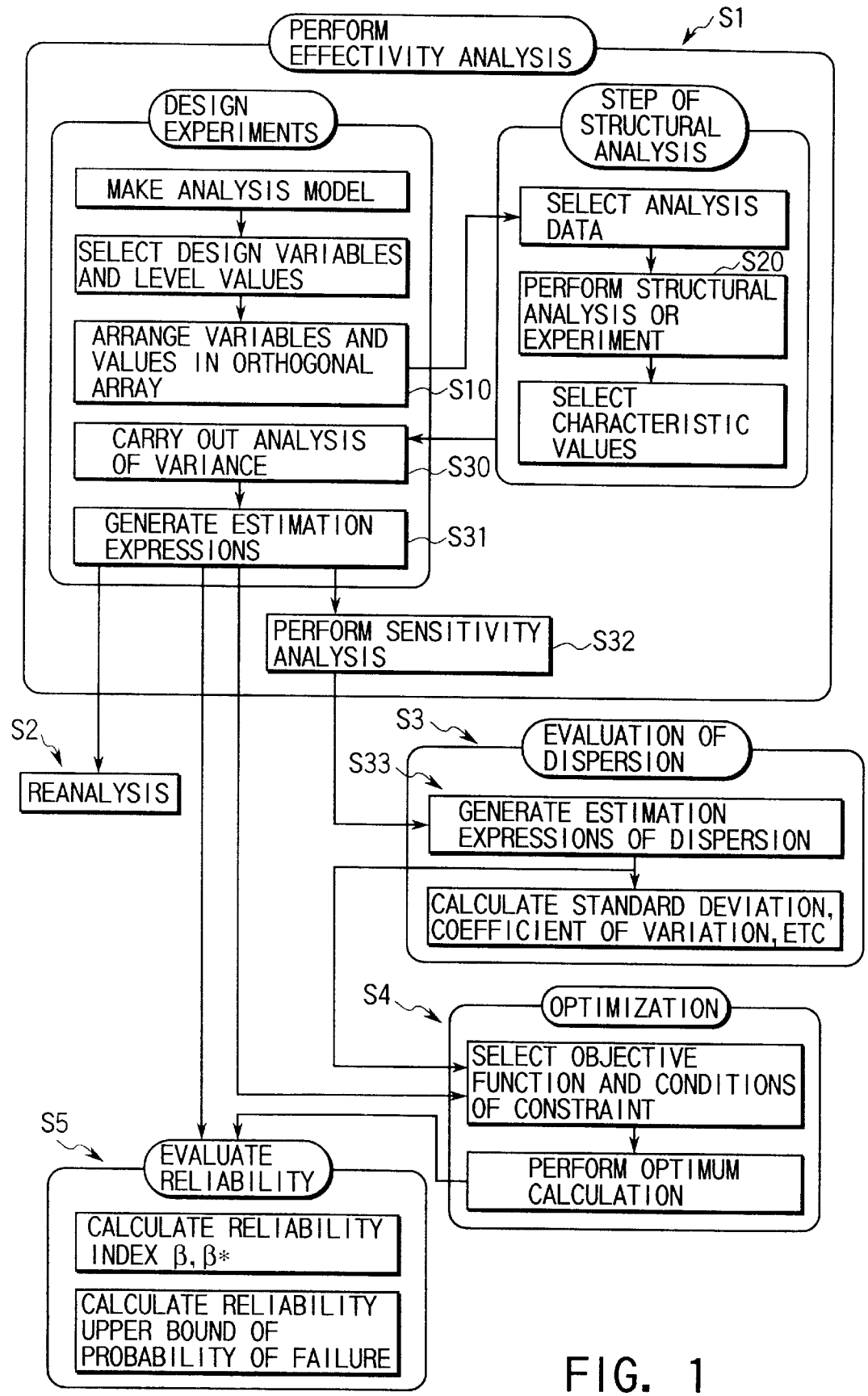
FIG. 1 is a diagram showing an outline of a design support method according to an embodiment of the present invention.
Figure 2:
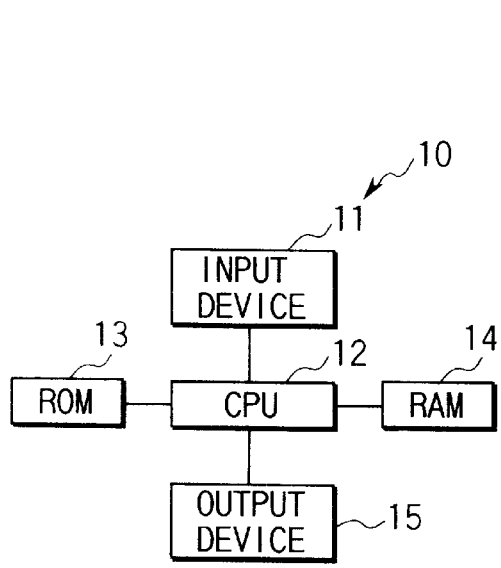
FIG. 2 is a diagram showing a outline of a system for carrying out the design support method of FIG. 1.

FIG. 2 shows an outline of a design support system 10 for carrying out a design support method according to the present invention. In this design support system 10, data and processing programs (mentioned later) are applied to the input of a central processing unit 12 by means of an input device 11, including a floppy disk unit, keyboard, etc., and are stored in a ROM (read-only memory), PROM (programmable read-only memory) 13, RAM (random access memory) 14, etc. Computation results are delivered to an output device 15, which includes a CRT (cathode-ray tube), liquid crystal display, printer, etc.

[Effectivity Analysis Process S1]

An effectivity analysis process S1 will be described first. In this process S1, an analysis method combining design of experiments and structural analysis is used in order to obtain the effectivity of design variables for characteristic values quantitatively with less analyses. In this analysis method, the structural analysis step is separated from other analysis and processing steps, so that general-purpose structural analysis programs may be also used.

In the design of experiments, the effectivity of variables for characteristic values is analyzed by using an orthogonal array in an orthogonal array allocation step S10. In the orthogonal array shown in TABLE 1, for example, a horizontal column number field and a vertical row number field designate variables and analysis data combination numbers, respectively. An orthogonal array is a table in which every two columns are combined in orthogonal relation. Thus, combinations of level numbers develop at the same frequency in any two columns in the orthogonal array.

TABLE 1

ORTHOGONAL ARRAY L27 ($3^{13}$)

| No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| | | A | B | A×B | e | e | e | C | D | E | F | G | H |
| DA- | 1 | 1 | 1 | 1 | 1 | 1 | 1 | 1 | 1 | 1 | 1 | 1 | 1 | 1 |
| TA | 2 | 1 | 1 | 1 | 1 | 2 | 2 | 2 | 2 | 2 | 2 | 2 | 2 | 2 |
| No. | 3 | 1 | 1 | 1 | 1 | 3 | 3 | 3 | 3 | 3 | 3 | 3 | 3 | 3 |
| | 4 | 1 | 2 | 2 | 2 | 1 | 1 | 1 | 2 | 2 | 2 | 3 | 3 | 3 |
| | 5 | 1 | 2 | 2 | 2 | 2 | 2 | 2 | 3 | 3 | 3 | 1 | 1 | 1 |
| | 6 | 1 | 2 | 2 | 2 | 3 | 3 | 3 | 1 | 1 | 1 | 2 | 2 | 2 |
| | 7 | 1 | 3 | 3 | 3 | 1 | 1 | 1 | 3 | 3 | 3 | 2 | 2 | 2 |
| | 8 | 1 | 3 | 3 | 3 | 2 | 2 | 2 | 1 | 1 | 1 | 3 | 3 | 3 |
| | 9 | 1 | 3 | 3 | 3 | 3 | 3 | 3 | 2 | 2 | 2 | 1 | 1 | 1 |
| | 10 | 2 | 1 | 2 | 3 | 1 | 2 | 3 | 1 | 2 | 3 | 1 | 2 | 3 |
| | 11 | 2 | 1 | 2 | 3 | 2 | 3 | 1 | 2 | 3 | 1 | 2 | 3 | 1 |
| | 12 | 2 | 1 | 2 | 3 | 3 | 1 | 2 | 3 | 1 | 2 | 3 | 1 | 2 |
| DA- | 13 | 2 | 2 | 3 | 1 | 1 | 2 | 3 | 2 | 3 | 1 | 3 | 1 | 2 |
| TA | 14 | 2 | 2 | 3 | 1 | 2 | 3 | 1 | 3 | 1 | 2 | 1 | 2 | 3 |
| No. | 15 | 2 | 2 | 3 | 1 | 3 | 1 | 2 | 1 | 2 | 3 | 2 | 3 | 1 |
| | 16 | 2 | 3 | 1 | 2 | 1 | 2 | 3 | 3 | 1 | 2 | 2 | 3 | 1 |
| | 17 | 2 | 3 | 1 | 2 | 2 | 3 | 1 | 1 | 2 | 3 | 3 | 1 | 2 |
| | 18 | 2 | 3 | 1 | 2 | 3 | 1 | 2 | 2 | 3 | 1 | 1 | 2 | 3 |
| | 19 | 3 | 1 | 3 | 2 | 1 | 3 | 2 | 1 | 3 | 2 | 1 | 3 | 2 |
| | 20 | 3 | 1 | 3 | 2 | 2 | 1 | 3 | 2 | 1 | 3 | 2 | 1 | 3 |
| | 21 | 3 | 1 | 3 | 2 | 3 | 2 | 1 | 3 | 2 | 1 | 3 | 2 | 1 |
| | 22 | 3 | 2 | 1 | 3 | 1 | 3 | 2 | 2 | 1 | 3 | 3 | 2 | 1 |
| | 23 | 3 | 2 | 1 | 3 | 2 | 1 | 3 | 3 | 2 | 1 | 1 | 3 | 2 |
| | 24 | 3 | 2 | 1 | 3 | 3 | 2 | 1 | 1 | 3 | 2 | 2 | 1 | 3 |
| DA- | 25 | 3 | 3 | 2 | 1 | 1 | 3 | 2 | 3 | 2 | 1 | 2 | 1 | 3 |
| TA | 26 | 3 | 3 | 2 | 1 | 2 | 1 | 3 | 1 | 3 | 2 | 3 | 2 | 1 |
| No. | 27 | 3 | 3 | 2 | 1 | 3 | 2 | 1 | 2 | 1 | 3 | 1 | 3 | 2 |

More specifically, design variables are arranged in the columns of the orthogonal array, and each row of the array provides input data for structural analysis. If interactions between the design variables are expected to be evaluated, the columns in which the variables and the interactions develop are selected with reference to a linear graph provided for the orthogonal array, and are allocated to the array. The orthogonal array L27 is a three-level orthogonal array in which 13 design variables can be analyzed at the maximum, each variable has three values, 1, 2 and 3, and input data are combined for 27 rows (27 sets).

In the case of an analysis using 8 design variables and 3 levels for each design variable, $3^8$ (=6,561) calculations are required if all conditions are combined together as in a multi-way layout. With use of the orthogonal array L27, however, a substantially equivalent effectivity analysis can be carried out on the basis of only 27 calculations. In the case of this orthogonal array, 8 design variables A to H can be arranged individually in 8 columns in total, including first and second columns and eighth to thirteenth columns. Interactions A×B between the design variables A and B in the first and second columns are arranged individually in third and fourth columns. The columns designated by e are error items.

Besides general orthogonal arrays L16($2^{15}$), L18($2^1 \times 3^7$), L16 ($4^5$), etc., there are known cases of multi-level orthogonal arrays L32($2^1 \times 49$), L64($4^{21}$), etc. and multi-variable arrays L36($2^{11} \times 3^{12}$), L54 ($2^1 \times 3^{25}$), etc. A suitable orthogonal array is selected for actual use, depending on the selected interactions and the number of levels. The number of levels must be settled in consideration of characteristics (tendencies) of influences of the design variables on the characteristic values. If the characteristic values are supposed to be n'th-order functions of the design variables, for example, the number of levels of the design variables range from (n+1) to (n+2).

In a structural analysis step S20, structural analysis is made with use of input data originated with reference to the aforesaid orthogonal array. Based on the result of this analysis, characteristic values to be handled in analysis of variance and estimation expressions, which will be mentioned later, are obtained. For example, the finite element method or the like is used as an approach to the structural analysis. In this structural analysis step S20, commercially available structural analysis programs and pre-post-processors or experiments can be utilized.

Based on the result of the structural analysis described above, data on characteristic values for analysis of variance are extracted. For the characteristic values, representative values that can appropriately represent subject phenomena are selected among values based on the analytic result. Instead of using the structural analysis programs, data (data for analysis of variance) corresponding to the structural analysis may be obtained experimentally.

In an analysis-of-variance step S30, the effectivity of the design variables for the characteristic values is evaluated in a manner such that it is orthogonally decomposed into polynomial components for detailed analysis. By this method, the effectivity can be obtained for characteristics (tendencies) that are decomposed into first- or second-degree components. In the process of analysis of variance, variations $S_i$ of the individual design variables and degree components i are first obtained by using data on the obtained characteristic values. Thereafter, variances Vi are obtained by dividing the variations $S_i$ by degrees of freedom $n_i$ (1 for the orthogonally decomposed design variables and degree components). Since the difference between a total variation $S_T$ and the sum $\Sigma S_i$ of the variations $S_i$ of the design variables and degree components is a variation of each error item, an error variance is obtained by dividing this difference by a degree of freedom $n_e$ of errors. The degree of freedom $n_e$ of errors is a value obtained by subtracting the sum of the degrees of freedom of the design variables and degree components from a total degree of freedom. The value of the total degree of freedom is equal to a value obtained by subtracting 1 from the number of rows of the orthogonal array. Then, an F-value is obtained by dividing the variance of the design variables and degree components by the error variance. Expressions (1) represent these relations.

Variation: $S_i$,
Variance: $V = S_i/n_i$,
Error variance:

$$V_e = \left(S_T - \sum_{i=1}^{k} S_i\right) / n_e,$$

F-value: $F_i = V_i/V_e$,
Net variation: $S_i' = S_i - V_e n_i$,
Contribution factor (%): $\rho_i = S_i'/S_T$
(i=1, 2, 3 . . . k) . . . (1)

In evaluating the analysis, the F-values of the design variables and degree components are compared with F-distribution values for the significance levels of 1% and 5%, whereby significant differences are examined. For the design variables and degree components with particularly small F-values, among other variables and components having been concluded to be subject to no significant differences by this stage, error variances are obtained again by adding their variations and degrees of freedom to those of the error items. The F-values of the design variables and degree components are obtained with use of the new error variances, and significant differences are determined again. A final result of analysis of variance is obtained by repeating this series of operations so that there are no design variables and degree components of which the F-values are smaller than the F-distribution value for the significance level of 5%.

Also, contribution factors $\rho_i$, which are the ratios of net variations $S_i'$, obtained by subtracting the products of the error variances and the degrees of freedom from the variations of the design variables and degree components, to the total variation $S_T$, are used as qualitative indexes that indicate the order of effectivity. For the analysis of variance of interaction that involves orthogonal decomposition, a multi-way array is newly arranged by using columns to which the subject design variables are allocated, and calculation is made with reference to this array.

In an estimation expression generation step S31, estimation expressions indicative of behaviors of the characteristic values are generated on the basis of the data obtained by the structural analysis. The estimation expressions for the characteristic values are represented by simple multi-variable polynomial expressions that use a plurality of design variables as parameters. Basically, those design variables and degree components which are concluded to be subject to significant differences by the analysis of variance are used in the estimation expressions. By this method, the design variables and degree components can be selected objectively.

The estimation expressions are generated by using an orthogonal polynomial expression (2), a Chebyshev orthogonal function. The expression (2) is one for the case where the levels are at regular intervals. This estimation expression corresponds to a regression expression that is generated on the basis of the result of analysis of the design variables (i.e., columns of the orthogonal array). More specifically, the regression expression is based on an average of analysis results corresponding to the individual levels of the design variables. Also, independent regression expressions are obtained individually for the design variables. The orthogonal polynomial expression is characterized in that low-order terms are given priority and the terms of the individual degrees are independent of one another. If the estimation expression is cut at a point corresponding to any desired degree, therefore, the best regression expression for the remaining degrees. Thus, if there are no significant differences in high-order components when a large number of levels are used for the analysis, it is necessary only that high-order terms be simply eliminated. The maximum degree for the design variables in the estimation expression corresponds to a level number minus 1. In the expression (2), m is the number of effective design variables used therein.

$$Y = g(f_1, f_2, \cdots f_m) \quad (2)$$

$$Y = \sum_{i=1}^{m} Y_i - (m-1)b_0 \quad (i = 1, 2, 3 \cdots m)$$

$$Y_i = b_0 + b_{i1}(f_i - \bar{f}_i) + b_{i2}\{(f_i - \bar{f}_i)^2 - (a_i^2 - 1)h_i^2/12\} +$$
$$b_{i3}\{(f_i - \bar{f}_i)^3 - (3a_i^2 - 7)(f_i - \bar{f}_i)h_i^2/20\} +$$

-continued
$$b_{i4}\{(f_i - \bar{f}_i)^4 - (3a_i^2 - 13)(f_i - \bar{f}_i)^2 h_i^2/14 +$$
$$3(a_i^2 - 1)(a_i^2 - 9)h_i^4/560\} + \cdots + b_{in}\xi_n(f_i) + \cdots$$

estimation expression $$\xi_0(f_i) = 1 \quad (n = 0)$$

$$\xi_1(f_i) = f_i - \bar{f}_i \quad (n = 1)$$

$$\xi_n(f_i) = \xi_{n-1}(f_i)\xi_1(f_i) - (n-1)^2\{a_i^2 - (n-1)^2\}$$

$$h_i^2 \xi_{n-2}(f_i)/[4\{4(n-1)^2 - 1\}] \quad (n = 2, 3, 4 \cdots)$$

$f_i$: parameter,
$\bar{f}_1$: average level value,
$a_i$: number of levels,
$h_i$: level interval.

Based on the orthogonal relation in the estimation expression, coefficients $b_0$ and $b_{ii}$ are represented as follows:
$b_0$=average of all analysis values, $$b_{ii} = \sum_{v=1}^{a} \xi_i(f_{iv})Y_{iv} / \sum_{v=1}^{a} \xi_i^2(f_{iv}) \quad v = 1, 2, \cdots, a_i \quad (3)$$

where $f_{iv}$ of $\xi(f_{iv})$ is each level value of the parameter $f_i$, and $Y_{iv}$ is an average of analysis values for the individual levels. A 95% confidence limit $R_{95}$ of the estimation expression is given by $$R_{95} = \sqrt{F_e^1 V_e / n_e} \quad (4)$$

where $Fe^1$ is a 5% F-value such that the degree of freedom of its denominator is equal to that of the error items and that the degree of freedom of its numerator is 1. $V_e$ and $n_e$ designate the error variance and the effective sample size, respectively.

Since the estimation expression Y is an explicit expression, a sensitivity $S(f_i)$, a primary differential coefficient represented by the following expression (5), can be easily obtained by partially differentiating the expression Y with the design variables $f_i$. This process is a sensitivity analysis step S32. This sensitivity is an independent value that is not influenced by the other design variables. In the expression (5), m is the number of effective design variables.

$$\text{sensitivity } S(f_i) = \partial Y / \partial f_i \quad (i = 1, 2, \cdots m) \quad (5)$$

This sensitivity represents a variation of each characteristic value that is caused as the unit value of each design variable changes. If the term of the design variable $f_i$ in the aforesaid expression is of the second or higher degree, $(\partial Y/\partial f_i)$ of the right side of the expression (5) is a function of the design variable. Although the sensitivity also changes as the value of the design variable changes, therefore, the sensitivity for any desired design variable value can be obtained by substituting a definite value of the design variable $f_i$ into the right side $(\partial Y/\partial f_i)$ of the expression (5).

Since the estimation expression is a function that continuously represents a phenomenon, the sensitivity obtained by partially differentiating it is an effectivity that is not influenced by the set level range described in connection with the analysis of variance. Therefore, the effectivity order of each design variable can be determined more securely by using the sensitivity than the analysis-of-variance result. Since this sensitivity is obtained by partially differentiating an estimation expression that represents the general behavior, it can directly represent the effectivity for a nonlinear phenomenon. Accordingly, it is possible directly to obtain the quantitative relation between the design variable and a maximum acceleration in a dynamic phenomenon or a characteristic value for a specific position, such as a maximum displacement, which cannot be obtained by sensitivity analysis based on the conventional numerical integration method, mode analysis method, etc.

Several pieces of information obtained by the effectivity analysis, such as the characteristic value estimation expression, sensitivity, etc., are quantitative design data that surpass the qualitative know-how that used to be obtained from skilled designers' experiences. Even a beginner can easily work out reasonable designs in accordance with these pieces of design information. For example, he may be able to enjoy high efficiency in working out a design that satisfies the strength and rigidity of the structure, attaching importance to high-sensitivity (or high-effectivity) design variables, or in making a high-robustness design with less dispersion by using low-sensitivity (or low-effectivity) design variables.

[Reanalysis Process S2]

The estimation expression for the characteristic values obtained in the effectivity analysis process S1 described above can be used in a reanalysis process S2. By using this estimation expression, a designer can easily notice without delay any change of characteristic values that accompanies a change of design, on the scene of the design work.

[Dispersion Evaluation Process S3]

The following is a description of a method for estimating and evaluating dispersion of the characteristic values that is caused by dispersion of the design variables. A stochastic/statistical method, such as the first-order second-moment method, is used for the estimation and evaluation of dispersion. A response $U$ of the characteristic values is given by a functional expression (6) that uses design variables $f_1, f_2, \ldots, f_m$ as probability variables. A function $g$ is an estimation expression for the characteristic values given by the expression (2). The response $U$ of the characteristic values obtained in consideration of the dispersion of the design variables is given by the expression (7) using a definite value $\bar{U}$, coefficient of variation (sensitivity) ($\partial g / \partial f1$), and variation width $\Delta f_1$ of the design variables. An expectation $E[U]$, a characteristic value for a definite value $\bar{f}_1$, is given by an expression (8). A variance $\text{Var}[U]$ can be obtained according to an expression (9) using variances $\text{Var}[f_i]$ and $\text{Var}[f_j]$ indicative of dispersions of design variables $f_i$ and $f_j$, correlation coefficient $\rho_{ij}$ between the values $f_i$ and $f_j$, and sensitivity.

$$U = g(f_1, f_2, \cdots, f_m) \quad (6)$$

$$U = \bar{U} + \sum_{i=1}^{m} (\partial g / \partial f_i)\bar{f}_i \Delta f_i \quad (7)$$

$$E[U] = g(\bar{f}_1, \bar{f}_2, \cdots, \bar{f}_m) \quad (8)$$

$$\text{Var}[U] = \sum_{i=1}^{m}\sum_{j=1}^{m} (\partial g / \partial f_i)\bar{f}_i (\partial g / \partial f_j)\bar{f}_j \quad (9)$$

$$\rho_{ij}\sqrt{\text{Var}[f_i]}\sqrt{\text{Var}[f_j]}$$

where ¯ indicates a definite value, m is the number of design variables, and (.) $\bar{f}_i$ indicates that the differentiation is evaluated by definite values ($\bar{f}_1, \bar{f}_2, \ldots, \bar{f}_m$).

A standard deviation $\sigma$ is a square root of the variance Var. A standard deviation $\sigma_U$ indicative of dispersion of the characteristic values is obtained as a square root of the expression (9). The sensitivity used in the expression (9) is identical with that of the expression (5), and can be easily obtained in an explicit form by partially differentiating the estimation expression for the characteristic values with the design variables. The variance $\text{Var}[f_i]$ of the design variables and the correlation coefficient $\rho_{ij}$ can be set in accordance with a user's data, experiences, etc. Thus, an estimation expression for the standard deviation $\sigma_U$ is given in an explicit form. The auto-correlation coefficient $\rho_{ij}$ is 1. A coefficient of variation (c. o. v), which is used as a criterion for dispersion relative to the expectation, can be obtained according to the following expression (10) based on the results described above:

$$\text{coefficient of variation (c. o. v)} = \sigma_U/E[U]. \quad (10)$$

[Optimization Process S4]

Formulation of a general optimization problem can be expressed as follows:

Conditions of constraint:

$$g_i(x) \geq 0 \ (i=1, 2, 3 \ldots, k),$$

$$h_j(x) = 0 \ (j=K+1, K+2, \ldots, 1).$$

objective function $f(x) \rightarrow$ minimum. (11)

The estimation expression (2) (for expectations of characteristic values) generated on the basis of the effectivity analysis and the dispersion estimation expression (9) are used for $g_i(x)$, $h_j(x)$ or $f(x)$ in the above expression. Accordingly, even complicated optimization problems can be set up with ease. The following is a description of examples of problem setup for an optimization calculation that is made in consideration of dispersion of the characteristic values. The setup is associated with two cases, (a) a general optimization problem and (b) a problem aimed mainly at robustness that is indispensable to stable manufacture.

(a) General Optimization Problem
   Objective function: weight→minimum.
   Conditions of constraint:
   characteristic value A (expectation+standard deviation)
      ≥set value, characteristic value B (expectation)=set value.

(b) Optimization Problem Aimed Mainly at Robustness
   Objective function: standard deviation of characteristic value→minimum.
   Conditions of constraint: set value≥expectation of characteristic value≥set value, weight≤set value.

The functions or estimation expressions to be used, like the characteristic values A and B shown in the aforesaid problem example (a), may be ones that are obtained from different analyses (e.g., strength analysis, eigenvalue analysis, etc.). Thus, the optimization calculation can be made in consideration of a plurality of phenomena and analysis conditions. This is so because the method according to the present invention is characterized in that its analysis processes are independent of one another.

A suitable calculation method for solving the optimization problem is selected among various optimization calculation methods, including the mathematical programming method, optimality criteria method, genetic algorithm, etc., in consideration of the contents of the problem and the type of the variables, whether design variables, continuous variables, or discrete variables. However, these methods are used as calculation methods for solving the optimization problem whose objective functions and constraints functions are all numerical formulas, not as optimization systems.

For example, the optimization calculation stated herein is made by the mathematical programming method that is the most popular general-purpose mathematical optimization method. There is a lot of conventional approaches to the mathematical programming. These approaches include, for example, the sequential quadratic programming (SQP) method, which is efficiently used for constrained nonlinear optimization problems that account for most of the actual problems.

According to the SQP method, sequentially approximated quadratic programming problems are originated as subproblems, as compared with the optimization problem of the expression (11), and are solved iteratively. An expression (12) represents an approximate expression obtained when a k'th iteration is given a point $x^{(k)}$. In the approximate expression, the objective function is approximated quadratically, and the conditions of constraint linearly.

Objective function:

$$\nabla f(x^{(k)})d+(1/2)d^T B^{(k)} d \to minimum.$$

Conditions of constraint:

$$g_i(x^{(k)})+\nabla g_i(x^{(k)})^T d \geq 0$$

$$h_j(x^{(k)})+\nabla h_j(x^{(k)})^T d = 0 \qquad (12)$$

B: Matrix approximated to Hesse matrix $\nabla^2 L(x^{(k)}, \lambda^{(k)})$ of Lagrangian function, d: Vector d (direction of search from $x^{(k)}$), $\nabla$: Partial differentiation coefficient (gradient vector) for variable $x^{(k)}$.

According to the prevailing mathematical programming methods including the sequential quadratic programming (SQP) method, however, it is not assured that a global optimal solution can be obtained for an optimization problem that involves a plurality of local optimal solutions. In such a case, therefore, it is necessary to make several optimization calculations with use of varied initial points and select the most appropriate solution among the resulting local optimal solutions. The genetic algorithm is an effective approach to the problem of this kind. According to optimization calculation based on the genetic algorithm, a global optimal solution can be obtained by being selected among a lot of solutions. The optimization calculation based on the genetic algorithm inevitably requires a bulky volume of calculation. Since optimization calculations that use estimation expressions, as in the case of the present invention, are very simple, even frequent convergence calculations entail no substantial time loss.

Optimization problems for the case where the design variables are discrete need not use any special algorithm such as the one for the mathematical programming methods. In this case, all combinations of the design variables and discrete values are calculated with use of objective functions and constraints functions that are generated on the basis of estimation expressions. Optimal solutions that meet the conditions can be selected in accordance with the calculation results. The discrete values need not be at regular intervals, and may be optional values. In general, this method requires numerous calculations. Since the estimation expressions used in this method are very simple, however, the frequent calculations arouse no problem, and the global optimal solution can be obtained securely in a short period of time even with use of a personal computer.

According to the present invention, explicit simple estimation expressions are used for the objective functions or constraints functions, so that optimal solutions can be obtained easily and efficiently by the use of any optimization method. Thus, a personal computer can satisfactorily serve for the optimization calculations.

[Reliability Evaluation Process S5]

The following is a description of a reliability evaluation method for a structure or the like that is designed on the basis of the aforementioned effectivity analysis and optimization calculations. In this case, a second-moment method is used such that reliability is evaluated by only expectations and variances without identifying a distribution form. In the field of civil engineering and construction industry, reliable design and structure reliability analysis methods are classified into three categories, LEVEL I (based on safety factor), LEVEL II (based on reliability index), and LEVEL III (based on probability of failure). According to the method of the present invention, which corresponds to the evaluation method LEVEL II, the reliability of structure is evaluated after obtaining a reliability index, a criterion based on the probability of failure. A performance function that defines the marginal state of a characteristic value is given by $$z = H(f_1, f_2, \ldots, f_m) \qquad (13)$$

where Z>0 and Z≤0 indicate a safety side and a danger side (failure region), respectively. This performance function expression can be generated in an explicit form by using the characteristic value estimation expression (2) and a design limit value. Using a limit value D and an estimation expression Y, an example of a simple performance function is given by $$Z = D - Y \qquad (14)$$

The following is a description of the first-order second-moment method (FOSM method) and the advanced first-order second-moment method (AFOSM method) that are applied to the aforesaid performance functions. By these methods, the reliability of structure is evaluated, and the upper limit of probability of failure is obtained.

(i) First-Order Second-Moment Method (FOSM Method)

A reliability index $\beta$ of the FOSM method, one of second-moment methods, can be obtained according to an expression (15). The index $\beta$ indicates the degree to which an expectation E[Z] is deviated from a marginal point (Z=0) with respect a standard deviation $\sigma Z$ as a criterion, with the distribution form of Z unidentified. As represented by an expression (16), the standard deviation $\sigma_Z$ is obtained as a square root of a variance Var[Z]. Since the performance function expression is explicit, the variance Var[Z] can be easily obtained according to an expression (17) in the same manner as in the case of the expression (9).

$$\beta = E[Z]/\sigma_Z \qquad (15)$$

$$\sigma_Z = \sqrt{Var[Z]} \qquad (16)$$

$$Var[Z] = \sum_{i=1}^{m} \sum_{j=1}^{m} (\partial H/\partial f_i)\overline{f}(\partial H/\partial f_j)\overline{f} \qquad (17)$$

$$\rho_{ij}\sqrt{Var[f_i]}\sqrt{Var[f_j]}$$

The reliability index $\beta$ of the FOSM method lacks in universality, however, since it varies as the way of encipherment changes, even though the physical contents of the performance functions are unchanged. Further, the performance functions are often nonlinear, and also in this case, the reliability index β of the FOSM method lacks in universality.

(ii) Advanced First-Order Second-Moment Method (AFOSM Method)

According to the advanced first-order second-moment (AFOSM) method, a universal reliability index can be obtained without regard to the form or representation of the performance functions. A reliability index β* of the AFOSM method is defined as the shortest distance from the origin of a space for standardized variables $Y_i$ given by an expression (18) to a point h(Y)=0 on a marginal state curved surface given by an expression (19). The point corresponding the shortest distance on this curved surface is referred to as a design point ($Y_i$*). The new variables $Y_i$ are standardized so that an average value $\mu_{Y_i}$ and a standard deviation $\sigma_{Y_i}$ are $\mu_{Y_i}=0$ and $\sigma_{Y_i}=1$, respectively. The values $\mu_{f_i}$ and $\sigma_{f_i}$ are an average and a standard deviation, respectively, of probability variables $f_i$.

$$Y_i = (f_i - \mu_{f_i})\sigma_{f_i} \quad (i = 1, 2, \cdots m) \tag{18}$$

$$Z = H(f_1, f_2, \cdots, f_m) \tag{19}$$
$$= h(Y_1, Y_2, \cdots, Y_m)$$

The values β* and $Y_i$* for the case where the performance functions are nonlinear are obtained by applying the iteration analysis method to a nonlinear optimization problem given by an expression (20). According to this approach, the performance functions are explicit, so that their values can be easily obtained by mathematical programming. In the case described herein, the aforesaid SQP (sequential quadratic programming) method is used for this calculation. Here it is to be supposed that there are no correlations between the basic variables $f_1, f_2, \ldots f_m$. In the case where the performance functions are linear functions, the values β and β* are equal.

Objective Function $$\sqrt{(Y_1^2 + Y_2^2 + \cdots + Y_m^2)} \rightarrow \text{minimum value} = \beta^*$$

Equality Constraints $$h(Y_1, Y_2, \ldots, Y_m)=0 \tag{20}$$

A partial safety factor $\gamma_{xi}$, the ratio of the design point to the average $\mu_{f_i}$ of the probability variables, may be obtained according to the following expression (21). The variables $f_i$* for the design point are obtained by reversely transforming the variables $Y_i$* into original variables according to the expression (18).

$$\gamma_{xi} = f_i^* / \mu_{f_i} (i=1,2, \ldots m) \tag{21}$$

Although a probability of failure $P_f$ cannot be obtained from only the expectations and variances if the distribution form of Z is unidentified, its upper limit, a safety-side value, can be obtained. This method, among other methods for obtaining the upper limit of the probability of failure, uses the following expression (22) that gives a low upper limit.

$$P_f < \sigma z^2/(\sigma z^2 + E[Z]^2) \tag{22}$$

This expression is applicable to the case of Z>0 where the performance function Z is on the safety side. The relation Z<0 that corresponds to the danger side (failure region) indicates a state of failure, that is, a failure probability of 1.

[Embodiment 1]
(Object of Analysis: Side Member for Automobile)

The most essential point of the design of an automobile is the measure to maintain the safety of the occupants of the vehicle in case of a crash. An automotive side member, a thin-walled reinforcing member, is an important member that serves to absorb kinetic energy produced by a crash, thereby positively lowering the level of an injury inflicted on each occupant. The kinetic energy of the side member is absorbed by a dynamic crushing phenomenon that consists mainly of buckling. This side member is expected to be able to absorb the kinetic energy efficiently in a limited space, and to be light in weight and low-priced.

A simulation technique for the dynamic crushing phenomenon based on structural analysis is currently utilized for the design of the side member. In order to improve the efficiency and accuracy of the design operation, it is effective to obtain the quantitative effectivity of design variables for crash energy absorption characteristics and utilize the effectivity for the settlement of the structure and design values. The sensitivity analysis method is a known effectivity analysis method. Since sensitivity coefficients obtained from dynamic phenomena vary depending on time and load path, however, they cannot be utilized directly for the estimation of characteristic values and optimization calculation.

A solution to this problem requires an effectivity analysis method and a characteristic value approximation method that can be applied to specific characteristic values, such as maximum and minimum values for the phenomena, cumulative values, etc. In order to meet this demand, the inventors hereof provide a practical, high-efficiency statistical design support method that combines design of experiments, structural analysis, and mathematical programming. According to this embodiment, effectivity analysis and optimization are carried out by applying the statistical design support method proposed by the inventors hereof to the dynamic crushing phenomenon of the thin-walled section member, which is a complicated nonlinear phenomenon involving dynamic, elastic-plastic, large deformation, and contact problems.

Figure 3:
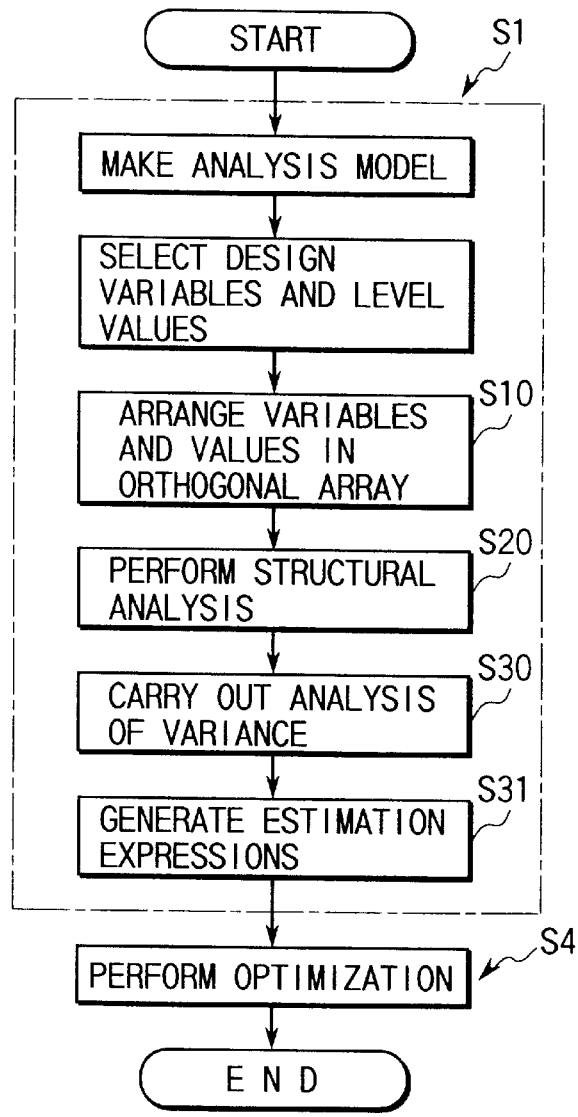
FIG. 3 is a flowchart showing a case in which a side member is designed.

FIG. 3 shows a flow of processing of the statistical design support method according to the present embodiment.

Figure 4:
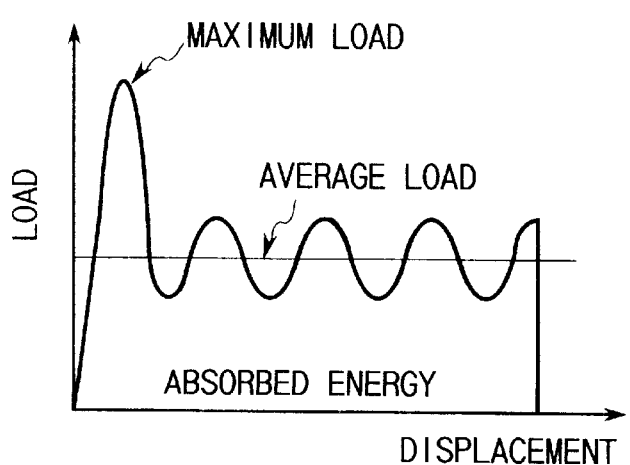
FIG. 4 is a diagram showing a relation between displacement and load obtained when the side member is crushed.

Automotive side members involve various crash conditions as well as other conditions including a variety of shapes and welding methods. The analysis stated herein is an analysis for a simplified dynamic crushing problem such that a thin-walled, straight square-section member with a uniform thickness is subjected to an initial velocity and caused to run against a rigid wall. FIG. 4 is a model diagram showing the relation between load and displacement associated with this problem. Absorbed energy, average load, and maximum load shown in FIG. 4 are typical characteristic values that are used for the evaluation of the performance of the member. According to this embodiment, the quantitative effectivity of the design variables for these characteristic values was revealed by a statistical optimization process, and optimization calculation for the minimum material cost was made.

(I) Effectivity Analysis Process S1

Five design variables were set for the member. These variables include a thickness t and sectional widths A and B, as shape variables, and a yield stress $\sigma_y$ and a work-hardening coefficient H, as material variables. The axial length was fixed to 400 mm. It may be supposed that the dynamic crushing phenomenon of this member has complicated nonlinearity and changes of the characteristic values that accompany the level value change also has nonlinearity.

Therefore, a four-level orthogonal array capable of generating estimation expressions of the third degree at the maximum was used in connection with the number of levels. TABLE 2 shows level ranges for the individual design variables. The individual level values are approximate to those values which are used in actual design. For these reasons, a four-level orthogonal array L32 that enables analysis of five design variables was selected as the orthogonal array used in the orthogonal array allocation step S10.

TABLE 2

| DESIGN VARIABLE | LEVEL 1 | LEVEL 2 | LEVEL 3 | LEVEL 4 |
|---|---|---|---|---|
| YIELD STRESS σy (MPa) | 294 | 343 | 392 | 441 |
| WORK-HARDENING COEFFICIENT (MPa) | 490 | 980 | 1470 | 1960 |
| THICKNESS t (mm) | 1.4 | 1.6 | 1.8 | 2.0 |
| SECTIONAL WIDTH A (mm) | 50 | 52.5 | 55 | 57.5 |
| SECTIONAL WIDTH B (mm) | 50 | 52.5 | 55 | 57.5 |

FIG. 5 shows part of the orthogonal array L32 that contains the design variables $\sigma_y$, H, t, A and B.

In the structural analysis step S20, structural analyses (static buckling mode analysis and dynamic crushing analysis) were carried out for 32 analysis conditions combined according to the orthogonal array.

An axial crushing phenomenon of a thin-walled square-section member is symmetrical. As shown in FIG. 6 illustrating an example of element division, therefore, quarter models obtained by cutting a square section with symmetry planes were used as analysis models. Square elements were used for the element division. In order to make element sizes for the individual analysis conditions as uniform as possible, models with width of 50 mm and 52.5 mm were divided into 10 equal parts in the width direction, and ones with width of 55 mm and 57.6 mm into 11 equal parts. Also, the models were axially divided into 80 equal parts for all the analysis conditions, and each element measured about 5 mm square. Since each analysis model was divided into its proper number of elements, the number of nodal points of each model ranged from 1,701 to 1,863, and the number of elements from 1,600 to 1,760. The prepared element-division models were used as basic-shape models in each structural analysis.

The static buckling mode analysis will be described first.

A thin-walled section member to be used as a side member of an automobile has a structure such that it can efficiently absorb kinetic energy by being gradually crushed like an accordion if it is subjected to an axial impact load. While the finite element method is used for this analysis, directly analyzing the member shape results in unnatural buckling, and cannot reproduce a dynamic crushing phenomenon. In order to reproduce this crushing phenomenon, the dynamic crushing analysis must be carried out by applying initial imperfection to the analysis models. In the analysis according to the present embodiment, the initial imperfection was set in accordance with a buckling mode obtained by the static buckling mode analysis. A finite element method program is used for the static buckling mode analysis. The elements used were thick-shell 4-node elements.

The analysis models used in the static buckling mode analysis were prepared by attaching the following analysis conditions to the basic-shape models. As boundary conditions, displacement restraints in the x-, y- and z-axis directions were applied to nodal points on the upper end face, and displacement restraints in the x- and y-axis directions to nodal points on the upper end face. Also, a restraint condition indicative of symmetry was attached to an x-z symmetry plane and a y-z symmetry plane. As a load condition, a uniform distribution load is applied to the nodal points on the upper end face in the negative direction along the z-axis. The static buckling mode analysis was carried out to obtain the buckling mode under these conditions. The average half-wavelength of 32 analyzed buckling waveforms was 100.16 mm.

The following is a description of the dynamic crushing analysis.

The analysis models affected by the initial imperfection was subjected to the dynamic crushing analysis, and the amount of absorbed energy and maximum load, characteristic values for the dynamic crushing phenomenon, were selected on the basis of the result of the analysis. The program of explicit finite element method (LS-NYNA3D) was used for the dynamic crushing analysis. The analysis models were made from aforesaid basic-shape models. The initial imperfection was applied in a manner such that the lower portion of each analysis model was subjected to small displacements depending on the buckling shape obtained by the static buckling mode analysis. The obtained initial imperfectional shape had a wavelength half that of a sine wave, and its maximum displacement was 1/10 of each thickness.

The elements used were Belytschko-Wong-Chiang shell elements. As boundary conditions, displacement restraints in the x- and y-axis directions were applied to the nodal points on the lower end face, and the restraint condition indicative of symmetry was attached to the x-z and y-z symmetry planes. A concentrated load of 250 kg was applied to the nodal points in the corners of the upper end of each model. Also, all the nodal points at the upper end portion including the corner nodal points were subjected to a rigid displacement restraint in the z-axis direction. As a crash condition, an initial velocity of 50 km/h was applied to all the nodal points on each model, and the models were caused to run against a rigid wall at the lower end portion. Contact conditions were contrived for the contact between the models and the rigid wall and the model themselves.

Figure 9:
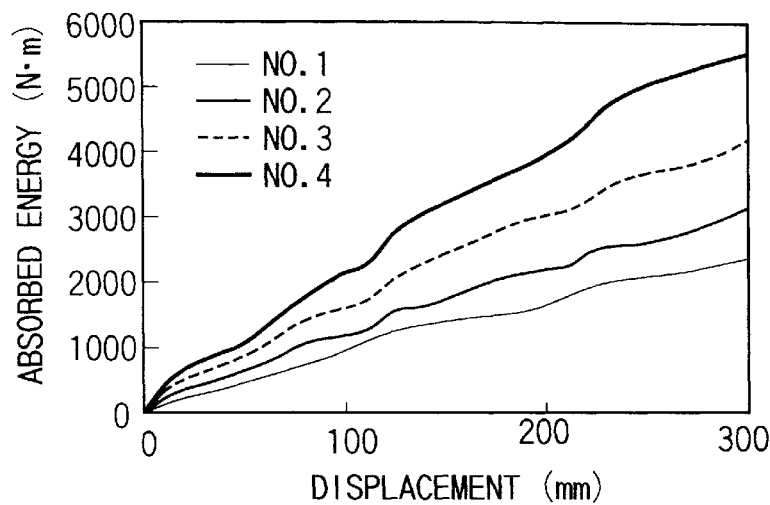
FIG. 9 is a diagram showing relations between absorbed energy and displacement obtained by analysis.

FIG. 7 shows a deformed quarter model obtained by the analysis, and FIG. 8 shows examples of load-displacement curves. As seen from these drawings, buckling is caused starting at the point to which the initial imperfection is applied, whereupon the maximum load is exhibited. With the passage of time, each model is gradually buckled like an accordion, so that the load increases or decreases cyclically. FIG. 9 shows curves illustrating relations between absorbed energy and displacement. In FIGS. 8 and 9, No. indicates an analysis number (row number) according to the orthogonal array.

In the analysis-of-variance step S30, analysis of variance and estimation expressions are originated for the characteristic values obtained by the aforementioned dynamic crushing analysis.

The absorbed energy will be described first.

The absorbed energy characteristic of the automotive side member is an essential evaluation item for crash safety. In order to design the member more efficiently, therefore, it is important to define the effectivity of the design variables of the member for the absorbed energy characteristic. In the analysis according to the present embodiment, absorbed energy amounts for displacements of 200 mm or less were used as characteristic values. TABLE 3 shows an output result (analysis-of-variance table) that represents the effectivity of the design variables for the characteristic values. In TABLE 3, items 1, 2 and 3 for FACTOR represent the first-, second-, and third-degree components, respectively, of each design variable, and ** for F RATIO indicates the presence of a significant difference at the significance level of 1%.

value with ± is the maximum value of the 95% reliability limit of the estimation expression.

$$E_{EN} = 2849.0 + 5.484(\sigma_y - 367.5) + \qquad (23)$$
$$0.2063(H - 1225) + 2565.8(t - 1.7) \pm$$
$$78.084 \quad (N \cdot m)$$

The estimation expression (23) was checked for accuracy by comparison with a solution by the finite element method

TABLE 3

| FACTOR | | SUM OF SQUARE | DEGREE OF FREEDOM | VARIANCE | F RATIO | EFFECTIVE RATIO (%) |
|---|---|---|---|---|---|---|
| H | 1 | 4.25735E+09 | 1 | 4.25735E+09 | 33.186** | 2.79 |
|   | 2 | 1.00467E+08 | 0 | 1.00467E+08 | 0.000 | 0.00 |
|   | 3 | 5.48866E+06 | 0 | 5.48866E+06 | 0.000 | 0.00 |
| t | 1 | 1.09676E+11 | 1 | 1.09676E+11 | 854.932** | 74.04 |
|   | 2 | 3.34830E+08 | 1 | 3.34830E+08 | 2.610 | 0.14 |
|   | 3 | 8.69674E+06 | 0 | 8.69674E+06 | 0.000 | 0.00 |
| A | 1 | 1.65220E+08 | 1 | 1.65220E+08 | 1.288 | 0.02 |
|   | 2 | 7.59463E+05 | 0 | 7.59463E+05 | 0.000 | 0.00 |
|   | 3 | 6.22298E+07 | 0 | 6.22298E+07 | 0.000 | 0.00 |
| B | 1 | 1.49480E+08 | 1 | 1.49480E+08 | 1.165 | 0.01 |
|   | 2 | 1.28695E+08 | 0 | 1.28695E+08 | 0.000 | 0.00 |
|   | 3 | 1.68218E+08 | 1 | 1.68218E+08 | 1.311 | 0.03 |
| $\sigma_y$ | 1 | 3.00824E+10 | 1 | 3.00824E+10 | 234.494** | 20.24 |
|   | 2 | 8.78674E+06 | 0 | 8.78674E+06 | 0.000 | 0.00 |
|   | 3 | 1.77357E+08 | 1 | 1.77357E+08 | 1.383 | 0.03 |
| ERROR | 1 | 2.95059E+09 | 23 | 1.28287E+08 | | 2.70 |
| TOTAL | | 1.47962E+11 | 31 | | | 100.00 |

Those design variables which were concluded to have an effectivity by the analysis of variance include three variables, the yield stress $\sigma_y$, work-hardening coefficient H, and thickness t. It is evident that the thickness t is more conducive than the other variables. While the degree that indicates the tendency of influence was programmed so as to be able to cope with the tendency of the third degree at the maximum, a primary tendency was obtained including the maximum load, which will be mentioned later. Supposedly, this is because the use of actual design values as level values resulted in relatively narrow level ranges, so that the effectivity was able to be represented by the primary tendency, the simplest one.

Figure 10:
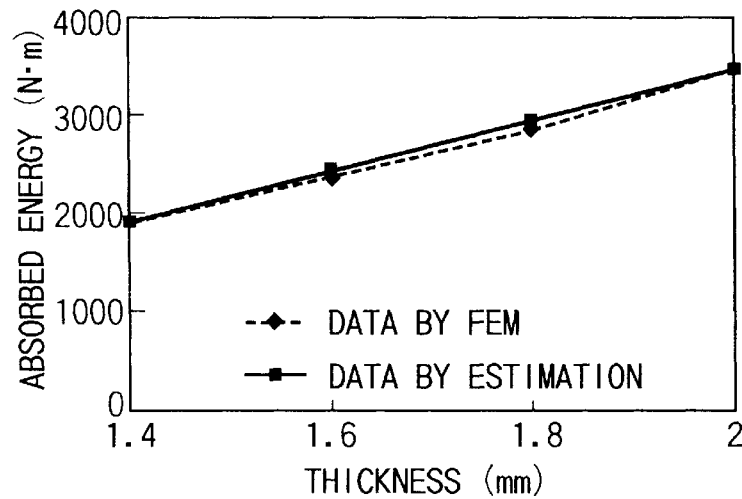
FIG. 10 is a diagram showing the accuracy of an estimation expression for the absorbed energy compared with the result of analysis by the FEM.

In the estimation expression generation step S31, an estimation expression (23) for absorbed energy $E_{EN}$ was generated according to the aforementioned formula or estimation expression (2) by using those design variables and degree components which had been concluded to have a significant difference by the analysis of variance. In the expression (23), t, $\sigma_y$ and H are design variables, and the (FEM). The analysis was carried out with the thickness varied within its level range and with all other design variables fixed to the level 2. In FIG. 10 showing the result of comparison, a maximum error or deviation between full and broken lines is 2.7%. It was confirmed that the method of the present embodiment is highly accurate despite the use of the simple primary estimation expression. Thus, the estimation expression can be utilized satisfactorily in place of recalculation based on the structural analysis.

The following is a description of the maximum load.

The maximum acceleration that is produced in the automobile's inhabitable section in case of a crash is believed to be associated with the maximum load that is generated in the initial stage of a crushing phenomenon of the member. Accordingly, it should be effective to reduce the maximum load for the maintenance of the safety of the occupants of the vehicle. TABLE 4 shows the result of analysis of variance (analysis-of-variance table) that represents the effectivity of the design variables for the maximum load.

TABLE 4

| FACTOR | | SUM OF SQUARE | DEGREE OF FREEDOM | VARIANCE | F RATIO | EFFECTIVE RATIO (%) |
|---|---|---|---|---|---|---|
| H | 1 | 1.33225E+04 | 1 | 1.33225E+04 | 0.490 | 0.00 |
|   | 2 | 4.50000E+02 | 0 | 4.50000E+02 | 0.000 | 0.00 |
|   | 3 | 1.44000E+03 | 0 | 1.44000E+03 | 0.000 | 0.00 |
| t | 1 | 2.75062E+07 | 1 | 2.75062E+07 | 1012.057** | 47.07 |
|   | 2 | 4.05000E+03 | 1 | 4.05000E+03 | 0.149 | 0.00 |
|   | 3 | 4.84000E+03 | 1 | 4.84000E+03 | 0.178 | 0.00 |
| A | 1 | 1.10224E+06 | 1 | 1.10224E+06 | 40.556** | 1.84 |
|   | 2 | 6.61250E+03 | 1 | 6.61250E+03 | 0.243 | 0.00 |
|   | 3 | 8.10000E+02 | 0 | 8.10000E+02 | 0.000 | 0.00 |

TABLE 4-continued

| FACTOR | | SUM OF SQUARE | DEGREE OF FREEDOM | VARIANCE | F RATIO | EFFECTIVE RATIO (%) |
|---|---|---|---|---|---|---|
| B | 1 | 7.15562E+05 | 1 | 7.15562E+05 | 26.328** | 1.18 |
|  | 2 | 6.12500E+02 | 0 | 6.12500E+02 | 0.000 | 0.00 |
|  | 3 | 6.25000E+01 | 0 | 6.25000E+01 | 0.000 | 0.00 |
| σy | 1 | 2.84260E+07 | 1 | 2.84260E+07 | 1045.898** | 48.64 |
|  | 2 | 4.05000E+03 | 1 | 4.05000E+03 | 0.149 | 0.00 |
|  | 3 | 1.10250E+03 | 0 | 1.10250E+03 | 0.000 | 0.03 |
| ERROR | 1 | 5.97927E+05 | 22 | 2.71785E+04 |  | 1.30 |
| TOTAL |  | 5.83808E+07 | 31 |  |  | 100.0 |

Those design variables which were concluded to be effective by the analysis of variance include the yield stress $\sigma_y$, thickness $\underline{t}$, and the respective primary components of the widths A and B. Any of these variables was significant at the significance level of 1%. Among these design variables, the yield stress $\sigma_y$ and the thickness $\underline{t}$ are shown to be more conducive than the other ones.

Based on the aforementioned formula or estimation expression (2), an estimation expression (24) for a maximum load $E_{MAXP}$ was generated in the estimation expression generation step S31, by using those design variables and degree components which had been concluded to have a significant difference by the analysis of variance. In the expression (24), $\sigma_y$, $\underline{t}$, A and B are design variables.

$$E_{MAXP} = 69585 + 168.6(\sigma_y - 367.5) + 40633(t - 1.7) + \\ 650.7(A - 53.75) + 524.3(B - 53.75) \pm \\ 1267.1 \quad (N) \tag{24}$$

Figure 11:
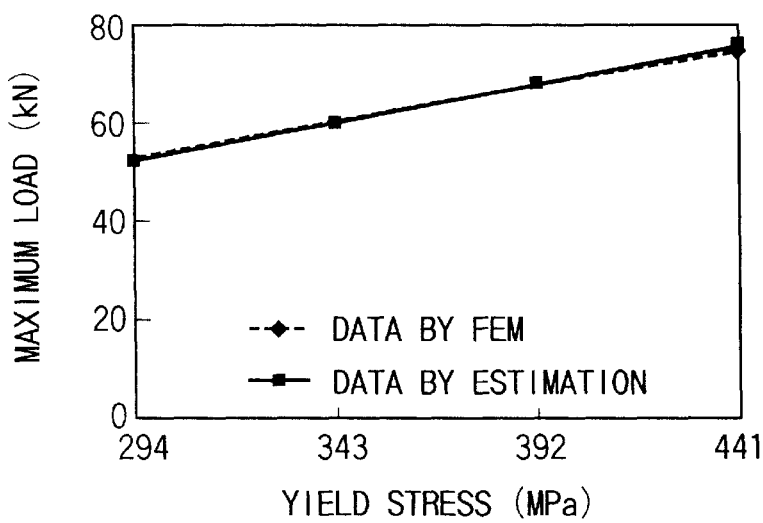
FIG. 11 is a diagram showing the accuracy of an estimation expression for the maximum load compared with the result of analysis by the FEM.

The estimation expression (24) was checked for accuracy by comparison with a solution by the finite element method. The analysis was carried out with the yield stress varied within its level range and with all other design variables fixed to the level 2. In FIG. 11 showing the result of comparison, a maximum error or deviation between full and broken lines is 1.1%. Thus, it was confirmed that the estimation expression used in the method of the present embodiment is highly accurate.

(II) Optimization Process S4

The optimization calculation for obtaining the minimum material cost of the thin-walled section member (side member) was obtained by the sequential quadratic programming. The estimation expression obtained in the aforesaid process was used as a behavior constraints function of an inequality. A material cost calculation expression (25) was used as an objective function with the thickness $\underline{t}$, widths A and B, and yield stress $\sigma_y$ as variables.

(a) Design variables: Yield stress $\sigma_y$, work-hardening coefficient H, thickness $\underline{t}$, and widths A and B.

(b) Objective function:

Material cost→minimum cost=0.00314t(A+B)($\sigma_y$/4.9+60) yen. (25)

(c) Behavior constraints: Absorbed energy amount for displacement of 200 mm.
$E_{EN} \geq 3,626$ N·m,
Maximum load $E_{MAXP} \leq 73,500$ N.

(d) Side constraints: Within level ranges for design variables.

294 MPa $\leq \sigma_y \leq$ 441 MPa,

490 MPa $\leq H \leq$ 1,960 MPa, 1.4 mm $\leq t \leq$ 2.0 mm, 50 mm $\leq A$ and $B \leq$ 57.5 mm.

TABLES 5 and 6 show the respective values of the objective function, constraints function, and design variables in the initial and final stages of the optimization calculation.

TABLE 5

|  | σy | H | t | A and B |
|---|---|---|---|---|
| INTIAL VALUE | 441 MPa | 1960 MPa | 2.0 mm | 57.5 mm |
| FINAL VALUE | 341 MPa | 1960 MPa | 2.0 mm | 50.0 mm |

TABLE 6

|  | OBJECTIVE FUNCTION | BEHAVIOR CONSTRAINTS | |
|---|---|---|---|
|  |  | ABSORBED ENERGY | MAXIMUM LOAD |
| INITIAL VALUE | 108.3 Yen | 4173.5 N · m | 98578N |
| FINAL VALUE | 81.4 Yen | 3626 N · m | 72932N |

[Embodiment 2]

(Object of Analysis: Seat Frame)

Figure 12:
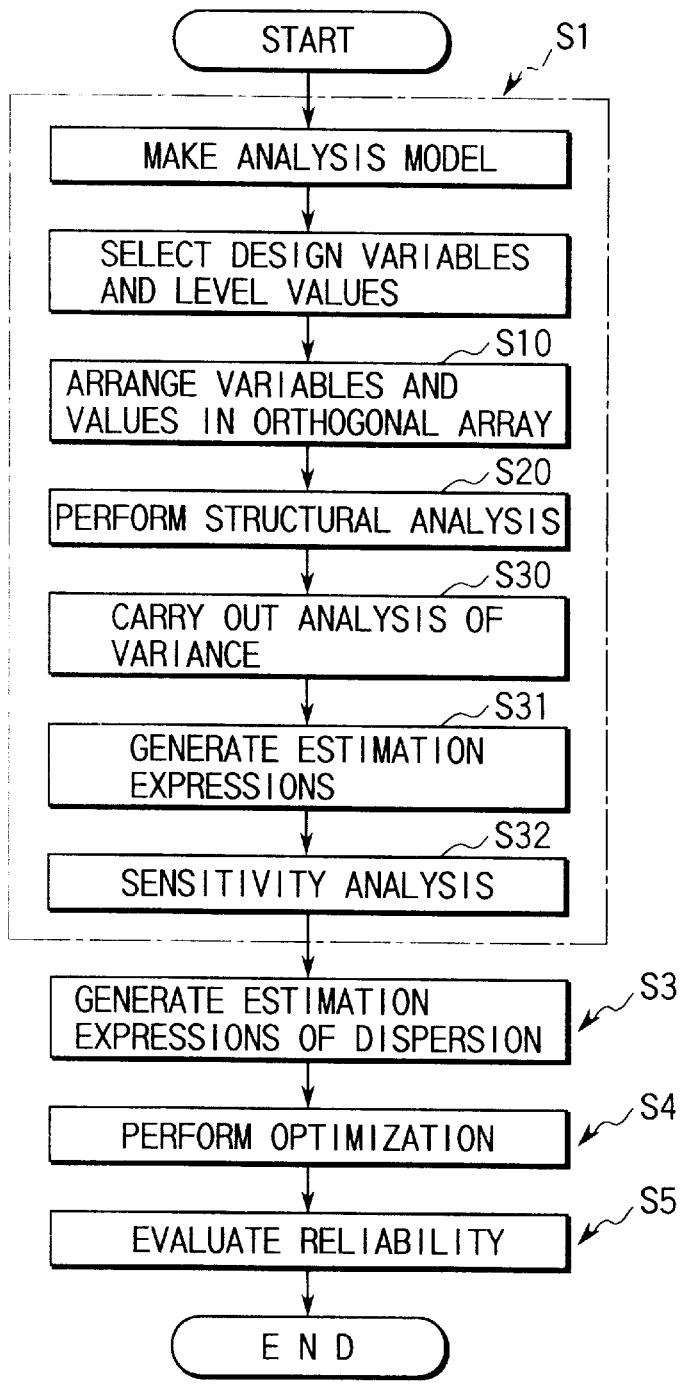
FIG. 12 is a flowchart showing a case in which a seat frame is designed.

An automotive seat frame was used as an object of analysis. In case of a crash, the seat frame is supposed to show a large deformation and nonlinear material behavior. In this analysis, optimization was carried out in consideration of dispersion while reliability evaluation was carried out without consideration of dispersion, as shown in the flowchart of FIG. 12.

(I) Effectivity Analysis Process S1

The design variables of the object of analysis were eight in total number, including the respective thicknesses and yield stresses of four members that constitute the seat frame. Three levels were used for characteristic values in a quadratic expression, and the aforementioned L27 was used as an orthogonal array for the orthogonal array allocation step S10. Portions C and D shown in FIG. 13 have a dual structure each, and are supposed to show a high effectivity for the characteristic values. Therefore, the individual design variables were arranged in the orthogonal array so as to be able to obtain an interaction between the respective thicknesses of the portions C and D. Thicknesses of 1.2 mm, 1.4 mm, and 1.6 mm and yield stresses of 196 MPa, 245 MPa, and 294 MPa were used as level values for the design variables.

Figure 13:
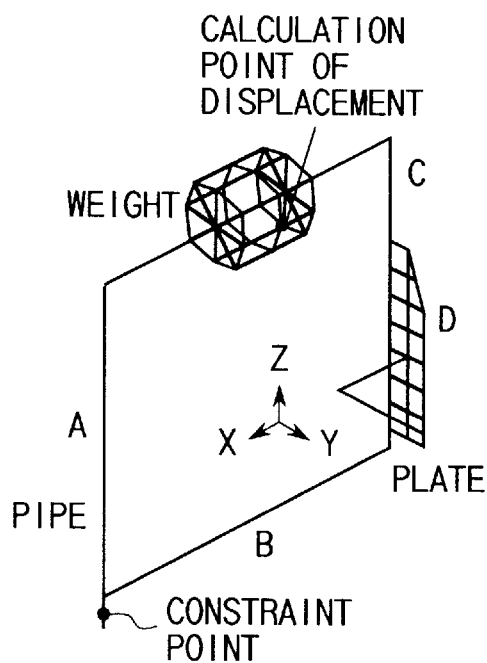
FIG. 13 is a diagram showing an analysis model of the seat frame.

The program of explicit finite element method (LS-DYNA3D) was used for impact analysis carried out in the structural analysis step S20. FIG. 13 shows an analysis model. A weight in this analysis model was used to apply a load from an input acceleration to the frame. The numbers of elements and nodes were 79 and 124, respectively. A half-sine-wave acceleration at the maximum rate of 300 m/sec$^2$ and cycles of 200 ms was applied to every restraint point.

In the analysis-of-variance step S30, the maximum displacement of the weight portion obtained by the structural analysis was used as a subject characteristic value for the analysis of variance. Table 7 shows the result of the analysis of variance. In TABLE 7, items 1 and 2 for FACTOR represent the first- and second-degree components, respectively, of each design variable, and ** and * for F RATIO indicate the presence of significant differences at the significance level of 1% and 5%, respectively. As seen from this table, an interaction $t_C \times t_D$ has no significant difference.

Figure 14:
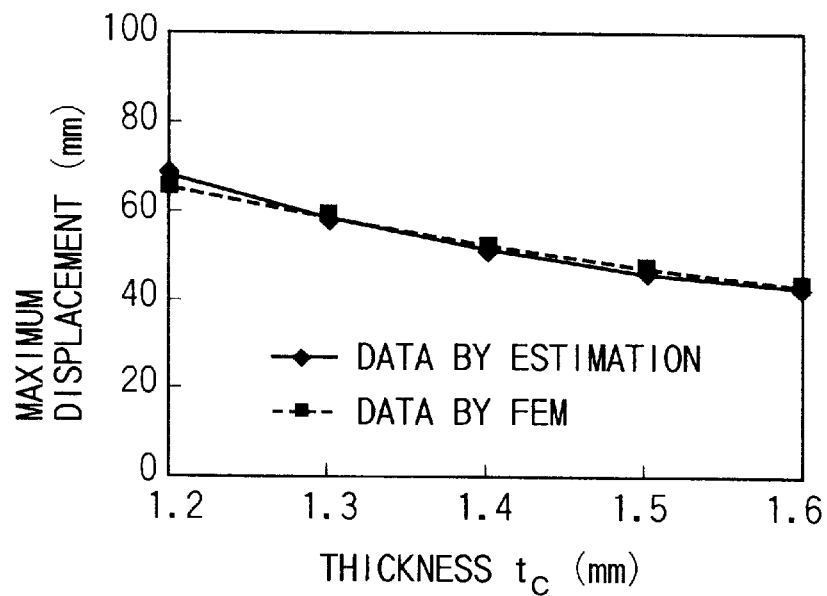
FIG. 14 is a diagram showing the accuracy of an estimation expression for the maximum displacement compared with the result of analysis by the FEM.

FIG. 14 shows the accuracy of estimation according to the estimation expression (26) compared with the result of calculation based on the aforesaid program of explicit finite element method.

(II) Dispersion Evaluation Process S3

The dispersion of the maximum displacement attributable to the dispersions of the thickness and yield stress as design variables was evaluated by the first-order second-moment method. This evaluation was made on the assumption that the design variables vary completely noncorrelatively. A standard deviation $\sigma_t$ of each design variable was obtained in a manner such that the coefficient of variation of the design variable was 3% of each thickness and 5% of each yield stress. An expression (27) is an estimation expression (dispersion estimation expression) for the variance of the maximum displacement generated on the basis of the maximum displacement estimation expression (26) in a second estimation expression generation step S33.

TABLE 7

| FACTOR | | SUM OF SQUARE | DEGREE OF FREEDOM | VARIANCE | F RATIO | EFFECTIVE RATIO (%) |
|---|---|---|---|---|---|---|
| $\sigma_A$ | 1 | 7.46113E + 02 | 1 | 7.46113E + 02 | 89.006** | 6.94 |
| | 2 | 1.01770E + 02 | 1 | 1.01770E + 02 | 12.140** | 0.88 |
| $\sigma_B$ | 1 | 4.47710E + 01 | 1 | 4.47710E + 01 | 5.341* | 0.34 |
| | 2 | 9.56765E + 00 | 0 | 9.56765E + 00 | 0.000 | 0.00 |
| $\sigma_C$ | 1 | 4.27279E + 03 | 1 | 4.27279E + 03 | 509.712** | 40.14 |
| | 2 | 1.48819E + 02 | 1 | 1.48819E + 02 | 17.753** | 1.32 |
| $\sigma_D$ | 1 | 1.44629E + 03 | 1 | 1.44629E + 03 | 172.531** | 13.54 |
| | 2 | 3.28567E + 01 | 1 | 3.28567E + 01 | 3.920 | 0.23 |
| $t_A$ | 1 | 3.49750E + 02 | 1 | 3.49750E + 02 | 41.723** | 3.21 |
| | 2 | 2.32421E + 00 | 0 | 2.32421E + 00 | 0.000 | 0.00 |
| $t_B$ | 1 | 1.51583E + 02 | 1 | 1.51583E + 02 | 18.083** | 1.35 |
| | 2 | 3.28609E + 00 | 0 | 3.28609E + 00 | 0.000 | 0.00 |
| $t_C$ | 1 | 2.30287E + 03 | 1 | 2.30287E + 03 | 274.716** | 21.60 |
| | 2 | 9.40078E + 01 | 1 | 9.40078E + 01 | 11.214* | 0.81 |
| $t_D$ | 1 | 8.13900E + 02 | 1 | 8.13900E + 02 | 97.092* | 7.58 |
| | 2 | 1.45538E + 01 | 0 | 1.45538E + 01 | 0.000 | 0.00 |
| $t_C \times t_D$ | | 4.05736E + 01 | 0 | 1.01434E + 01 | 0.000 | 0.00 |
| ERROR | 1 | 1.17359E + 02 | 14 | 8.38279E + 00 | | 2.10 |
| TOTAL | | 1.06229E + 04 | 26 | | | 100.00 |

Those design variables and degree components which had been concluded to have an effectivity by the analysis of variance were extracted, and an estimation expression (26) for the maximum displacement was generated according to the aforementioned formula or estimation expression (2) in the estimation expression generation step S31, by using the extracted values. In the expression (26), t and a are design variables of the member.

Maximum Displacement U $$\text{Maximum displacement } U = 61.24 - 56.56(t_C - 1.4) + 98.96\{(t_C - 1.4)^2 - 0.02667\} - 33.62(t_D - 1.4) - 0.3144(\sigma_C - 245) + 0.002074\{(\sigma_C - 245)^2 - 1601\} - 22.04(t_A - 1.4) - 0.1314(\sigma_A - 245)0.001715\{(\sigma_A - 245)^2 - 1601\} - 14.51(t_B - 1.4) - 0.03218(\sigma_B - 245) - 0.1830(\sigma_D - 245) \quad (\text{mm}) \quad (26)$$

$$\text{Var}[U] = (-0.6612 t_A)^2 + (-0.4353 t_B)^2 + \quad (27)$$
$$(-1.009 t_D)^2 + [\{-1.697 + 5.937(t_C - 1.4)\} t_C]^2 +$$
$$[\{-0.00657 + 0.0001715(\sigma_A - 245)\}\sigma_A]^2 +$$
$$[\{-0.01572 + 0.0002074(\sigma_C - 245)\}\sigma_C]^2 +$$
$$(-0.001609 \sigma_B)^2 + (-0.009147 \sigma_D)^2$$

Figure 15:
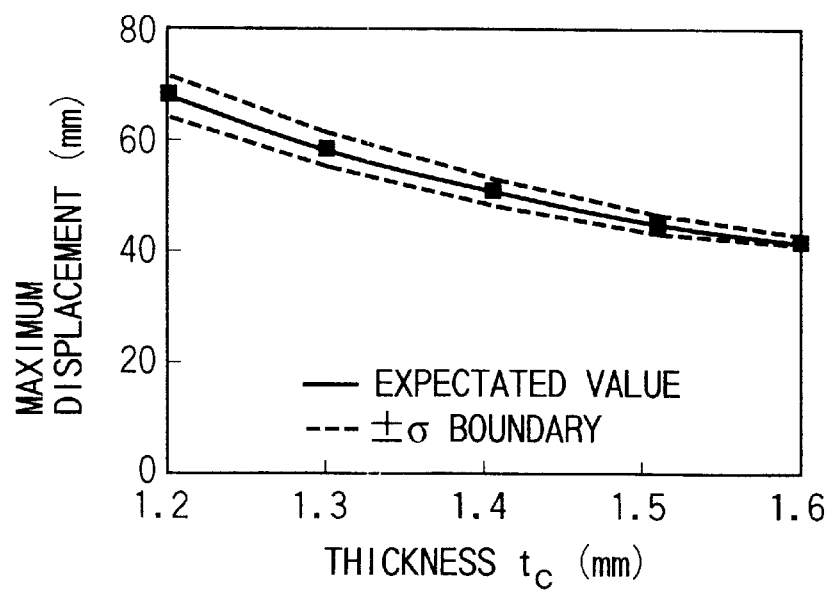
FIG. 15 is a diagram showing change of the maximum displacement compared with change of a thickness $t_C$.
Figure 16:
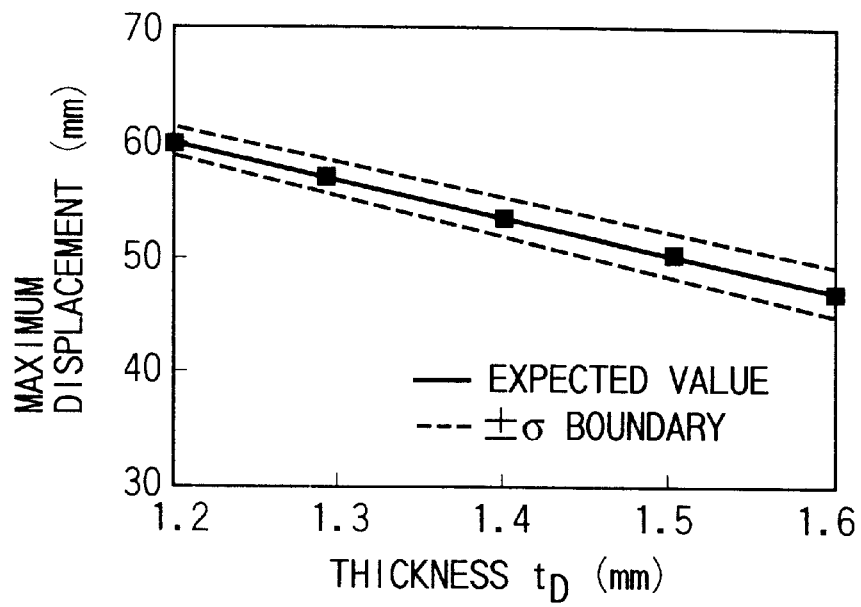
FIG. 16 is a diagram showing change of the maximum displacement compared with change of a thickness $t_D$.
Figure 17:
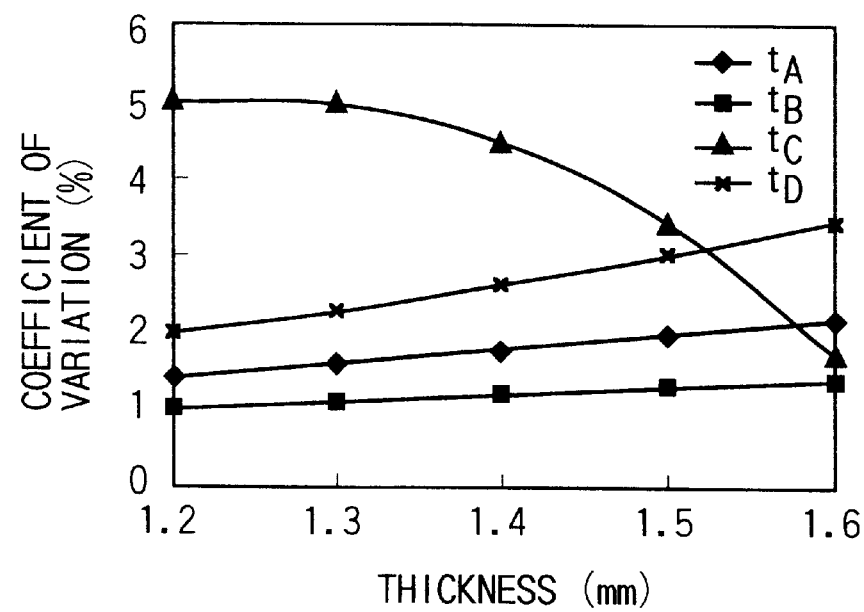
FIG. 17 is a diagram showing relations between thickness and coefficient of variation.

FIGS. 15 and 16 show changes (variation behaviors) of the maximum displacement observed when design variables $t_C$ and $t_D$ are independently varied by a margin corresponding to the standard deviation. In FIGS. 15 and 16, the full line represents an expectation of the maximum displacement, and the broken lines represent $\pm 1\sigma$-bounds obtained by adding to and subtracting the standard deviation $\sigma_U$, a square root of the expression (27), from the expectation. FIG. 17 shows results obtained by rearranging the coefficient of variation of the maximum displacement with respect to changes of the individual thicknesses. Since the explicit dispersion estimation expression can be obtained in this manner, change of dispersion that accompanies change of each design variable can be obtained quantitatively with ease. A high-accuracy design and stable product design with less dispersion can be effected by utilizing these evaluation results and the estimation expression. In FIGS. 15 to 17, the levels of any other design variables than the subject variable are given as dispersion-free intermediate values, in order to clarify the independent influence of the subject variable.

(III) Optimization Process S4

An optimization calculation for the minimization of the material cost of the seat frame was made by sequential quadratic programming. The estimation expression for the maximum displacement was utilized as a behavior constraints function of an inequality. The optimization calculation was carried out for each of two cases where the dispersion of the maximum displacement were taken into consideration and not.

Design variables: Thickness and yield stress of each member (8 variables in total).

Objective function: The material cost (function of thickness and yield stress) is given by following expression (28).

$$COST = 0.012331\{(25.4t_A - t_A^2)(\sigma_A/4.9 + 70) + \quad (28)$$

$$(25.4t_B - t_B^2)(\sigma_B/4.9 + 70) +$$

$$(25.4t_C - t_C^2)(\sigma_C/4.9 + 70)\} +$$

$$0.109272 t_D(\sigma_D/4.9 + 70) \quad \text{(yen)}$$

(a) Optimum Calculation with no Reflection of Dispersion

Conditions of Constraint:

Maximum displacement (exp. (26))$\leq$50 mm,

Thickness (1.2 mm$\leq$t$\leq$1.6 mm),

Yield stress (196 MPa$\leq\sigma_y\leq$294 MPa).

Optimization Result: Target Value=151.4 yen (frequency of convergence=19),

Maximum Displacement=50 mm (Standard Deviation=5.6 mm),

Variable Values ($t_A$=1.2 mm, $t_B$=1.2 mm, $t_C$=1.26 mm, $t_D$=1.59 mm; $\sigma_A$=233 MPa, $\sigma_B$=196 MPa, $\sigma_C$=277 MPa, $\sigma_D$=294 MPa).

(b) Optimum Calculation with Reflection of Dispersion

Conditions of Constraint:

Maximum displacement (exp. (26))+standard deviation (square root of exp. (27))$\leq$50 mm, Thickness (1.2 mm$\leq$t$\leq$1.6 mm), Yield stress (196 MPa$\leq\sigma_y\leq$294 MPa).

Optimization Result: Target Value=153.8 Yen (frequency of conversion=14),

Maximum Displacement+Standard Deviation=44.7 mm+5.3 mm =50 mm,

Variable Values ($t_A$=1.2 mm, $t_B$=1.2 mm, $t_C$=1.29 mm, $t_D$=1.6 mm; $\sigma_A$=239 MPa, $\sigma_B$=196 MPa, $\sigma_C$=283 MPa, $\sigma_D$=294 MPa).

Comparison between the results of these two optimization calculations indicates that the material cost must be increased by 2.4 yen in order to avoid influence of dispersion. More specifically, 2.4 yen can be regarded as a cost for crash safety that is improved in consideration of the standard deviation $\sigma_U$=5.3 mm of the maximum displacement.

(IV) Reliability Evaluation Process S5

The reliability of structure was evaluated by the second-moment method. The evaluation was carried out for combinations of variable values that had been obtained by the optimization calculation with reflection of dispersion, for example. A performance function expression (29) was set according to the estimation expression (26) for the maximum displacement on the assumption that the seat frame loses its faculty when the maximum displacement reaches its limit value, 50 mm.

$$Z=50 \text{ mm}-\text{maximum displacement (exp. (26))}. \quad (29)$$

Substituting an expectation E[Z]=5.3 and standard deviation $\sigma_Z$=5.3 mm, obtained according to the expression (29), into the expression (16), in order to obtain the reliability index $\beta$ for the FOSM method, we obtained $\beta$=1. This was established because the evaluation point was obtained under the conditions of constraint that the maximum displacement should be deviated from the limit value by a margin corresponding to the standard deviation in the optimization calculation. In this case, the upper limit of the probability of failure is $P_f$<0.5 (see expression (22)). The reliability index $\beta^*$ for the AFOSM method was calculated according to an expression (30) by using the aforementioned SQP method. In the expression (30), Y is a variable standardized by the expression (18). Z(Y) is a Y-function version of the expression (29).

Objective Function:

$$\sqrt{Y_{tA}^2 + Y_{tB}^2 + Y_{tC}^2 + Y_{tD}^2 + Y_{\sigma A}^2 + Y_{\sigma B}^2 + Y_{\sigma C}^2 + Y_{\sigma D}^2} \to \text{minimum value} = \beta^*$$

Equality Constraints:

$$Z(Y)=0 \quad (30)$$

The reliability index (AFOSM method) was $\beta^*$ =0.972 (frequency of convergence=19).

TABLE 8 shows design points and partial safety factors obtained at the same time.

TABLE 8

|  | $t_A$ | $t_B$ | $t_c$ | $t_d$ | $\sigma_A$ | $\sigma_B$ | $\sigma_C$ | $\sigma_D$ |
|---|---|---|---|---|---|---|---|---|
| $-Y^*$ | 0.138 | 0.091 | 0.55 | 0.28 | 0.334 | 0.055 | 0.445 | 0.446 |
| $f^*$ | 1.20 | 1.20 | 1.27 | 1.59 | 235 | 195 | 277 | 287 |
| $\gamma$ | 0.996 | 0.997 | 0.983 | 0.992 | 0.983 | 0.997 | 0.978 | 0.977 |

When the respective values of the reliability indexes $\beta$ and $\beta^*$ for the performance function of the expression (29) were compared, $\beta^*$ for the AFOSM method evaluated on the safety side was found to be smaller than $\beta$ for the FOSM method, but without any substantial difference. Although this example of evaluation was carried out for the design values obtained in the optimization calculation, the reliability of structure can be easily evaluated for any desired design values with use of an explicit performance function expression.

Even for a nonlinear problem, as described above, the dispersion of characteristic values can be evaluated quantitatively, and explicit dispersion estimation expressions can be obtained with ease. Optimization with reflection of dispersion can be easily effected by using the dispersion estimation expressions, along with the characteristic value estimation expressions, as functions for the optimization calculation. Since the performance function can be obtained in an explicit form by the method according to the present embodiment, moreover, the reliability index of the designed structure and the upper limit of the probability of failure can be also obtained with ease. Thus, a high-accuracy design and stable product design with less dispersion can be effected in success.

[Embodiment 3]

(Object of Analysis: Rubber Switch)

A circular rubber switch for a keyboard used in an electronic apparatus was used as an object of analysis. An outline of processing is similar to the one shown in FIG. 12. In this case, however, the reliability evaluation process S5 is omitted.

The feeling of operation of circular rubber switches for the keyboard is essential to the utility value and operating efficiency (efficiency of key operation) of the keyboard. The behavior of each keyswitch in operation is a complicated phenomenon that involves a large deformation, contact, and nonlinear material behavior. This behavior is represented by a reaction force displacement curve showing the relation between the operating force and the depth of depression. It is known that this behavior brings about a so-called snap through phenomenon. A characteristic value obtained from this reaction force displacement curve is a typical index of a finger's feeling of operation. This characteristic is derived from circular rubber switches of diaphragm structure, main components of the keyboard. In this analysis, quantitative effectivity of the design variables for the reaction force displacement curve was obtained in order to clarify the relation between the finger's feeling of operation and the design variables of each rubber switch.

(I) Effectivity Analysis Process S1

Figure 18:
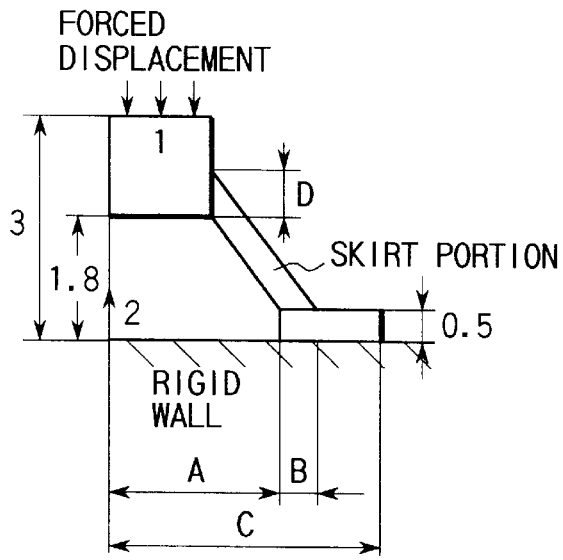
FIG. 18 is a diagram showing an analysis model of a rubber switch.

The circular rubber switch has a shape symmetrical with respect to its axis, and its load and deformation are also symmetrical with respect to the axis. Therefore, a half section shown in FIG. 18 was used as an analysis model. The design variables were five in number, including independent sectional dimensions A, B, C and D (mm) of the rubber switch and a friction coefficient $\mu$ between the underside of the switch and a switch mounting surface, both of which are rigid. For levels, a three-level system was used such that an effectivity given by a quadratic expression can be obtained on the assumption that the relations between the characteristic values and the design variables are nonlinear. In the orthogonal array allocation step S10, the aforementioned L27 was used as an orthogonal array to which these design variables and levels are applicable. TABLE 9 shows level values for the design variables.

TABLE 9

| DESIGN VARIABLE | LEVEL 1 | LEVEL 2 | LEVEL 3 |
|---|---|---|---|
| A | 1.78 mm | 1.75 mm | 1.72 mm |
| B | 0.335 mm | 0.345 mm | 0.355 mm |
| C | 2.45 mm | 2.50 mm | 2.55 mm |
| D | 0.56 mm | 0.60 mm | 0.64 mm |
| $\mu$ | 0.10 | 0.15 | 0.20 |

General-purpose finite element method software (ABAQUS) was used in the structural analysis step S20. Axially symmetrical solid elements were used as analysis elements, while a hyperelastic model represented by an expression of Mooney Rivlin was used as a material. Mooney Rivlin constants $C_{10}$ (=0.23667 N·mm) and $C_{01}$ (=0.05918 N·mm) were used for the analysis.

Figure 19:
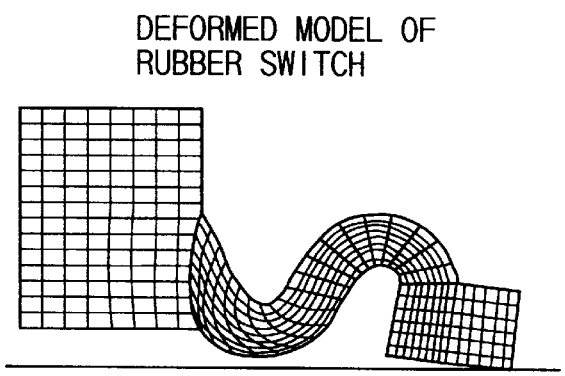
FIG. 19 is a diagram showing the analysis model of the rubber switch in a deformed state.
Figure 20:
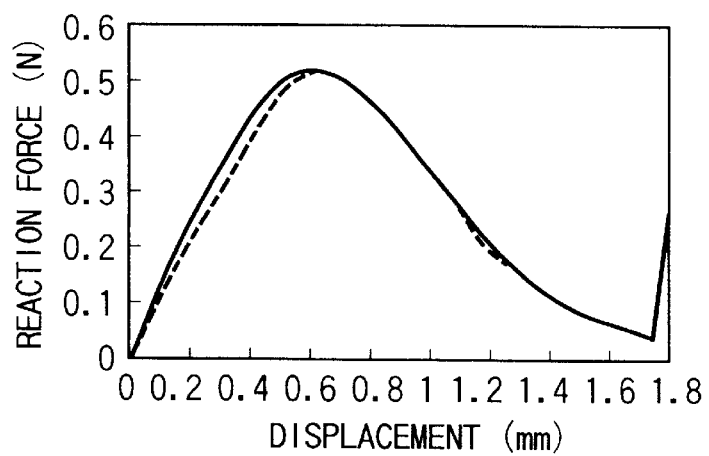
FIG. 20 is a diagram showing relations between the displacement and reaction force of the rubber switch.

As a load condition, a uniform forced displacement was applied to nodal points at the upper end portion of the model in the negative direction along the z-axis. As a restraint condition, an axial displacement restraint was applied to nodal points on the axis of symmetry. Contact conditions were contrived for the contact between the model and the rigid wall and the model itself. FIG. 19 shows the deformed model, and FIG. 20 shows the relation between a reaction force produced at the upper end portion and a displacement in the direction of the z-axis. FIG. 20 illustrates the way the reaction force increases again as a depressed region of the switch touches the rigid wall after a snap through phenomenon having a peak is displayed.

A click feeling in an operator's fingers and the heaviness of depression are closely associated with the maximum reaction force. In the analysis-of-variance step S30, therefore, the maximum reaction force was selected as a characteristic value (evaluation value) that represents the finger feeling. In the analysis of variance, the effectivity of the design variables for the characteristic values was decomposed into first- and second-order components. TABLE 10 shows the result of the analysis of variance. In TABLE 10, ** and * for F RATIO indicate the presence of significant differences at the significance levels of 1% and 5%, respectively. As seen from this table, the respective first-order components of design variables D and B are highly effective. The design variables D and B are factors that determine the thickness of a skirt portion of the circular rubber switch. A design variable A, which proved to be the most effective variable but two, is a factor that determines the rising angle of the skirt portion. This skirt portion is empirically known as a region that has the greatest influence on the maximum reaction force, so that the result of this analysis can be regarded as appropriate.

TABLE 10

| FACTOR | | SUM OF SQUARE | DEGREE OF FREEDOM | VARIANCE | F RATIO | EFFECTIVE RATIO (%) |
|---|---|---|---|---|---|---|
| A | 1 | 1.45692E − 05 | 1 | 1.45692E − 05 | 78.499** | 5.42 |
|   | 2 | 1.82970E − 08 | 0 | 1.82970E − 08 | 0.000 | 0.00 |
| C | 1 | 1.73601E − 08 | 0 | 1.73601E − 08 | 0.000 | 0.00 |
|   | 2 | 5.07227E − 08 | 1 | 5.07227E − 08 | 0.273 | 0.00 |
| D | 1 | 2.25123E − 04 | 1 | 2.25123E − 04 | 1212.967** | 84.74 |
|   | 2 | 2.15335E − 09 | 0 | 2.15335E − 09 | 0.000 | 0.00 |
| B | 1 | 1.87190E − 05 | 1 | 1.87190E − 05 | 100.859** | 6.98 |
|   | 2 | 2.03390E − 08 | 0 | 2.03390E − 08 | 0.000 | 0.00 |
| $\mu$ | 1 | 3.22834E − 06 | 1 | 3.22834E − 06 | 17.394** | 1.15 |
|   | 2 | 3.81338E − 08 | 1 | 3.81338E − 08 | 0.205 | 0.00 |
| ERROR | 1 | 3.71194E − 06 | 20 | 1.85597E − 07 | | 1.7 |
| TOTAL | | 2.65440E − 04 | 26 | | | 100.00 |

In the estimation expression generation step S31, an estimation expression (31) for characteristic values was generated according to the aforementioned formula or estimation expression (2), by using those design variables and degree components which had been concluded to have a significant difference by the aforesaid analysis of variance. In the expression (31), A, B, D and $\mu$ are design variables.

Maximum Reaction Force:

$$0.5087-0.2939(A-1.75)+0.9994(B-0.345)+0.8664(D-0.6)+\\ 0.083(\mu-0.15)\ (N) \quad (31)$$

Figure 21:
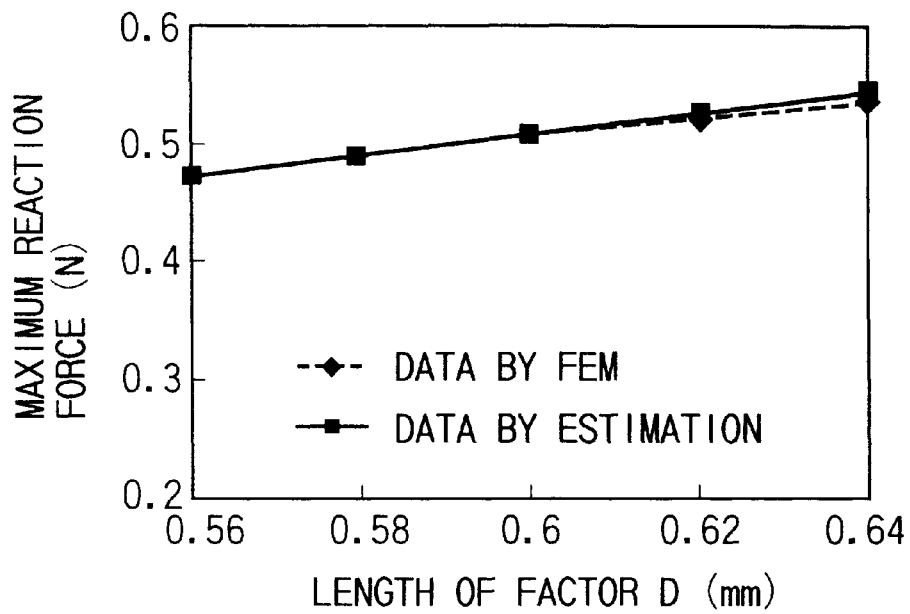
FIG. 21 is a diagram showing the accuracy of an estimation expression for the maximum reaction force of the rubber switch compared with the result of analysis by the FEM.

In order to check the estimation expression (31) for accuracy, the design variable D with the significant difference was changed in five stages within its level, and analysis values obtained according to the general-purpose finite element method software (ABAQUS) and the estimation expression were compared. The other design variables than the variable D were fixed to the level 2. FIG. 21 shows the result of the comparison between the obtained values. In FIG. 21, the full and broken lines closely resemble each other, and the maximum error of estimated values obtained by the method of the present embodiment was as low as 1.1%. As seen from these results, the estimation expression according to this embodiment is highly accurate, and can replace recalculation based on the structural analysis.

In the sensitivity analysis step S32, sensitivity values for the maximum reaction force were obtained, as shown in TABLE 11, by differentiating the aforesaid estimation expression (31) with the individual design variables. These sensitivity values are quantitative effectivity values that directly represent variations of the maximum reaction force obtained when the respective values of the design variables are changed by a unit margin. The order of the quantitative effectivity values based on the sensitivity of the design variables was given as follows:

$B>D>A>\mu$.

TABLE 11

| DESIGN VARIABLE | SENSITIVITY |
|---|---|
| A | −0.2939 (N/mm) |
| B | 0.9994 (N/mm) |
| D | 0.8664 (N/mm) |
| $\mu$ | 0.083 (N) |

(II) Dispersion Evaluation Process S3

In this process S3, the dispersion of the maximum reaction force attributable to the dispersions of the design variables was detected by the aforementioned first-order second-moment method. This dispersion evaluation was made on the assumption that the design variables vary completely noncorrelatively. The standard deviation $\sigma$ of each design variable was obtained in a manner such that the coefficient of variation of the design variable was 3% for the size and 20% for the friction coefficient. An expression (32) is an estimation expression for the variance (dispersion) of the maximum reaction force generated on the basis of the maximum reaction force estimation expression (31) in the second estimation expression generation step S33.

$$\text{Var}[U]=(0.008817A)^2+(0.02998B)^2+(0.02599D)^2+(0.0166\mu)^2 \quad (32)$$

Figure 22:
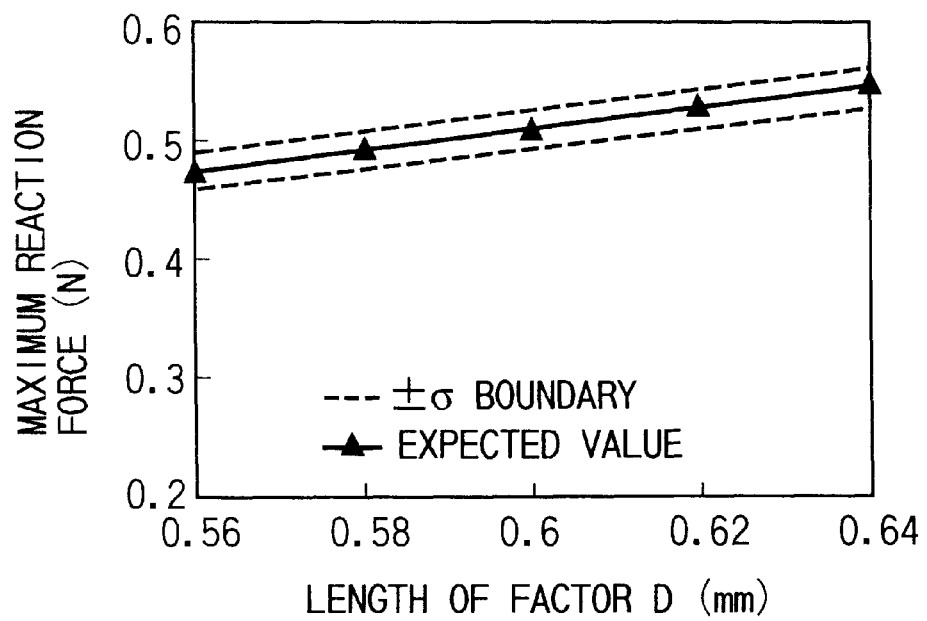
FIG. 22 is diagram showing change of a dimension D compared with change of the maximum reaction force.

FIG. 22 shows change of the maximum reaction force observed when the design variable D is singly varied by a margin corresponding to the standard deviation. In FIG. 22, the full line represents an expectation of the maximum reaction force, and the broken lines represent ±1σ-bounds obtained by adding to and subtracting the standard deviation $\sigma_U$, a square root of the expression (32), from the expectation. Since the explicit dispersion estimation expression can be obtained in this manner, change of dispersion that accompanies change of each design variable can be obtained quantitatively with ease. In FIGS. 21 and 22, the levels of any other design variables than the subject variable are given as dispersion-free intermediate values, in order to clarify the independent influence of the subject variable.

(III) Optimization Process S4

An optimization calculation of the sectional dimensions of the circular rubber switch for the reduction of the material cost was made by the aforementioned sequential quadratic programming. The estimation expression for the maximum reaction force with reflection of dispersion was utilized as a behavior constraints function.

(a) Design variables: Five in number.
(b) Objective function: Sectional area (mm$^2$) of $$\text{half section} = 0.5(D+2.3)(A+B-1)- \\ 1.15(A-1)+0.5(C-A-B)+1.2 \quad (33)$$

(c) Behavior constraints function:
  max. reaction force−std. dev.$\geq$0.5 N,
  max. reaction force+std. dev.$\leq$0.55 N.
(d) Side constraints: Within level ranges for design variables.
(e) Optimization result:
  Target value=2.11 mm$^2$.
  Variable values (A=1.74 mm, B=0.335 mm,
  C=2.45 mm, D=0.621 mm, $\mu$=0.2).
(f) Frequency of convergence: Three times.

As describe above, the statistical design support method proposed by the inventors hereof is applied to the circular rubber switch for keyboard that displays complicated non-linear behavior. By doing this, the analysis of effectivity, evaluation of dispersion, and optimization calculation can be carried out efficiently and easily.

We claim:

1. A computer program product which enables a computer system to support the design of a structure, comprising:

a storage medium;

storing means provided in the storage medium for storing different kinds of orthogonal arrays, the different kinds of orthogonal arrays being utilized to arrange data regarding design variables and levels which are set in accordance with objects to be analyzed;

means for causing the computer system to arrange the data regarding the design variables in each row and column of an orthogonal array selected from the storing means on the basis of the design variables and levels of an object to be analyzed, with reference to level numbers of the orthogonal array;

means for causing the computer system to output the results of data arrangement in the orthogonal array;

means for causing the computer system to receive the results of structural analysis which is executed on the basis of the data arranged in the orthogonal array;

means for causing the computer system to execute an analysis of variance on data of characteristic values which are obtained on the basis of the results of the structural analysis, said characteristic values indicating characteristics of the object to be analyzed; and means for causing the computer system to extract design variables and degree components which have high effectivity for the characteristic values on the basis of the results of the analysis of variance and to generate estimation expressions in relation to the characteristic values on the basis of the extracted design variables and degree components by use of orthogonal functions.

2. The computer program product according to claim 1, further comprising means for causing the computer system, after generating the estimation expressions, to execute a target optimization calculation in a mathematical optimization method by use of the estimation expressions.

3. The computer program product according to claim 2, further comprising means for causing the computer system, after executing the target optimization calculation, to obtain a numerical value indicative of an evaluation of reliability in a stochastic/statistical method.

4. The computer program product according to claim 1, further comprising means for causing the computer system, after generating the estimation expressions, to execute a sensitivity analysis to obtain a degree of change of characteristic values incurred by a change in the design variables, by partially differentiating the estimation expressions with the design variables.

5. The computer program product according to claim 4, further comprising means for causing the computer system to generate an estimation expression of dispersion on the basis of the results of the sensitivity analysis in a stochastic/statistical method.

6. The computer program product according to claim 5, further comprising means for causing the computer system, after generating the estimation expression of dispersion, to execute a target optimization calculation for the object in a mathematical optimization method.

7. A method which enables a computer system to support the design of a structure, comprising:

storing different kinds of orthogonal arrays, the different kinds of orthogonal arrays being utilized to arrange data regarding design variables and levels which are set in accordance with objects to be analyzed;

an arranging step for causing the computer system to arrange the data regarding the design variables in each row and column of an orthogonal array selected on the basis of the design variables and levels of an object to be analyzed, with reference to level numbers of the orthogonal array;

an output step for causing the computer system to output the results of data arrangement in the orthogonal array;

a receiving step for causing the computer system to receive the results of structural analysis which is executed on the basis of the data arranged in the orthogonal array;

an executing step for causing the computer system to execute an analysis of variance on data of characteristic values which are obtained on the basis of the results of the structural analysis, said characteristic values indicating characteristics of the object to be analyzed; and an extracting step for causing the computer system to extract design variables and degree components which have high effectivity for the characteristic values on the basis of the results of the analysis of variance and to generate estimation expressions in relation to the characteristic values on the basis of the extracted design variables and degree components by use of orthogonal functions.

8. The method according to claim 7, further comprising the step of causing the computer system, after generating the estimation expressions, to execute a target optimization calculation in a mathematical optimization method by use of the estimation expressions.

9. The method according to claim 8, further comprising the step of causing the computer system, after executing the target optimization calculation, to obtain a numerical value indicative of an evaluation of reliability in a stochastic/statistical method.

10. The method according to claim 7, further comprising the steps of causing the computer system, after generating the estimation expressions, to execute a sensitivity analysis to obtain a degree of change of characteristic values incurred by a change in the design variables, by partially differentiating the estimation expressions with the design variables.

11. The method according to claim 10, further comprising the step of causing the computer system to generate an estimation expression of dispersion on the basis of the results of the sensitivity analysis in a stochastic/statistical method.

12. The method according to claim 11, further comprising the step of causing the computer system, after generating the estimation expression of dispersion, to execute a target optimization calculation for the object in a mathematical optimization method.

* * * * *